US012790862B2

(12) United States Patent
Rickenbaugh et al.

(10) Patent No.: US 12,790,862 B2
(45) Date of Patent: Nov. 10, 2026

(54) REMOTE LOCK ASSEMBLY FOR USE WITH A MULTIPOINT LOCK SYSTEM

(71) Applicant: Amesbury Industries, Inc., Edina, MN (US)

(72) Inventors: Allen Rickenbaugh, Sioux Falls, SD (US); Matt Halbersma, Brandon, SD (US); Gary Tagtow, Sioux Falls, SD (US); Chad Kramer, Sioux Falls, SD (US); Douglas John Criddle, Sioux Falls, SD (US)

(73) Assignee: Amesbury Industries, Inc., Edina, MN (US)

( * ) Notice: Subject to any disclaimer, the term of this patent is extended or adjusted under 35 U.S.C. 154(b) by 0 days.

(21) Appl. No.: 19/203,338

(22) Filed: May 9, 2025

(65) Prior Publication Data

US 2025/0369267 A1 Dec. 4, 2025

Related U.S. Application Data

(60) Provisional application No. 63/652,762, filed on May 29, 2024.

(51) Int. Cl.
*E05C 9/04* (2006.01)

(52) U.S. Cl.
CPC .................................... *E05C 9/04* (2013.01)

(58) Field of Classification Search
CPC . E05C 9/04; E05C 9/042; E05C 9/045; E05C 9/20; E05C 9/025; E05C 9/1833;
(Continued)

(56) References Cited

U.S. PATENT DOCUMENTS 333,093 A 12/1885 Wright
419,384 A 1/1890 Towne
(Continued)

FOREIGN PATENT DOCUMENTS

AU 84928 12/1920
CA 2631521 11/2009
(Continued)

OTHER PUBLICATIONS

"Intercity Locks—For All Your Security Needs—Fast", http://www.directlocks.co.uk/locks-multipoint-locks-c-123_96.html, accessed Oct. 27, 2011, original publication date unknown, 3 pgs.
(Continued)

*Primary Examiner* — Steven A Tullia
(74) *Attorney, Agent, or Firm* — Merchant & Gould P.C.

(57) ABSTRACT

A remote lock assembly for a multipoint lock system includes a housing, an auto-fire latch assembly configured to move between an extended position and a retracted position, and a drive assembly configured to operate the latch assembly. The drive assembly includes a slide plate slidable within the housing and defining an opening. A sliding latch support is coupled to the latch assembly and has a protrusion extending through the opening of the slide plate and engaged with the housing. Sliding movement of the slide plate is configured to drive extension and retraction of the latch assembly via the sliding latch support while enabling the auto-fire latch assembly to maintain auto-fire operation.

20 Claims, 21 Drawing Sheets

(58) Field of Classification Search
CPC . E05C 9/22; E05C 9/24; E05C 9/1841; Y10T 292/0836; Y10T 292/0971; Y10T 292/0837; Y10T 292/084; Y10T 292/0834; Y10T 292/096; Y10T 292/0977; Y10T 292/0976; Y10T 292/0964; Y10T 70/5385; Y10T 70/5372; E05B 55/00; E05B 59/00; E05B 63/143; E05B 9/02
See application file for complete search history.

(56) References Cited

U.S. PATENT DOCUMENTS

| | | | |
|---|---|---|---|
| 651,947 A | | 6/1900 | Johnson |
| 738,280 A | | 9/1903 | Bell et al. |
| 932,330 A | | 8/1909 | Rotchford |
| 958,880 A | | 5/1910 | Lawson |
| 966,208 A | | 8/1910 | Hoes |
| 972,769 A | | 10/1910 | Lark |
| 980,131 A | | 12/1910 | Shean |
| 998,642 A | | 7/1911 | Shean |
| 1,075,914 A | | 10/1913 | Hoes |
| 1,094,143 A | | 4/1914 | Hagstrom |
| 1,142,463 A | | 6/1915 | Shepherd |
| 1,174,652 A | | 3/1916 | Banks |
| 1,247,052 A | | 11/1917 | Wilson |
| 1,251,467 A | | 1/1918 | Blixt et al. |
| 1,277,174 A | | 8/1918 | Bakst |
| 1,359,347 A | | 11/1920 | Fleisher |
| 1,366,909 A | | 2/1921 | Frommer |
| 1,368,141 A | | 2/1921 | Hagstrom |
| 1,529,085 A | | 3/1925 | Preble |
| 1,574,023 A | | 2/1926 | Crompton et al. |
| 1,596,992 A | | 8/1926 | Ognowicz |
| 1,646,674 A | | 10/1927 | Angelillo |
| 1,666,654 A | | 4/1928 | Hiering |
| 1,716,113 A | | 6/1929 | Carlson |
| 1,974,253 A | | 9/1934 | Sandor |
| 2,535,947 A | | 12/1950 | Newell |
| 2,729,089 A | | 1/1956 | Pelcin |
| 2,739,002 A | | 3/1956 | Johnson |
| 2,862,750 A | | 12/1958 | Minke |
| 2,887,336 A | | 5/1959 | Meyer |
| 2,905,493 A | | 9/1959 | Tocchetto |
| 3,064,462 A | | 11/1962 | Ng et al. |
| 3,083,560 A | | 4/1963 | Scott |
| 3,124,378 A | | 3/1964 | Jackson |
| 3,157,042 A | | 11/1964 | Wolz |
| 3,162,472 A | | 12/1964 | Rust |
| 3,214,947 A | | 11/1965 | Wikkerink |
| 3,250,100 A | | 5/1966 | Cornaro |
| 3,332,182 A | | 7/1967 | Mark |
| 3,378,290 A | | 4/1968 | Sekulich |
| 3,413,025 A | | 11/1968 | Sperry |
| 3,437,364 A | | 4/1969 | Walters |
| RE26,677 E | | 10/1969 | Russell et al. |
| 3,498,657 A | | 3/1970 | Giampiero |
| 3,578,368 A | | 5/1971 | Dupuis |
| 3,586,360 A | | 6/1971 | Perrotta |
| 3,617,080 A | | 11/1971 | Miller |
| 3,670,537 A | | 6/1972 | Horgan, Jr. |
| 3,792,884 A | | 2/1974 | Tutikawa |
| 3,806,171 A | | 4/1974 | Fernandez |
| 3,899,201 A | | 8/1975 | Paioletti |
| 3,904,229 A | | 9/1975 | Waldo |
| 3,919,808 A | | 11/1975 | Simmons |
| 3,933,382 A | | 1/1976 | Counts |
| 3,940,886 A | | 3/1976 | Ellingson, Jr. |
| 3,953,061 A | | 4/1976 | Hansen et al. |
| 4,050,272 A | | 9/1977 | Tanaka |
| 4,076,289 A | | 2/1978 | Fellows et al. |
| 4,116,479 A | | 9/1978 | Poe |
| 4,130,306 A | | 12/1978 | Brkic |
| 4,132,438 A | | 1/1979 | Guymer |
| 4,135,377 A | | 1/1979 | Kleefeldt |
| 4,146,994 A | | 4/1979 | Williams |
| 4,236,396 A | | 12/1980 | Surko et al. |
| 4,273,368 A | | 6/1981 | Tanaka |
| 4,283,882 A | | 8/1981 | Hubbard |
| 4,288,944 A | | 9/1981 | Donovan |
| 4,362,328 A | | 12/1982 | Tacheny |
| 4,365,490 A | | 12/1982 | Manzoni |
| 4,372,594 A | | 2/1983 | Gater |
| 4,476,700 A | | 10/1984 | King |
| 4,500,122 A | | 2/1985 | Douglas |
| 4,547,006 A | | 10/1985 | Castanier |
| 4,548,432 A | | 10/1985 | Bengtsson |
| 4,593,542 A | | 6/1986 | Rotondi et al. |
| 4,595,220 A | | 6/1986 | Hatchett, Jr. |
| 4,602,490 A | | 7/1986 | Glass |
| 4,602,812 A | | 7/1986 | Bourne |
| 4,607,510 A | | 8/1986 | Shanaan et al. |
| 4,633,688 A | | 1/1987 | Beudat |
| 4,639,025 A | | 1/1987 | Fann |
| 4,643,005 A | | 2/1987 | Logas |
| 4,691,543 A | | 9/1987 | Watts |
| 4,704,880 A | | 11/1987 | Schlindwein |
| 4,706,512 A | | 11/1987 | McKernon et al. |
| 4,717,909 A | | 1/1988 | Davis |
| 4,754,624 A | | 7/1988 | Fleming et al. |
| 4,768,817 A | | 9/1988 | Fann |
| 4,799,719 A | | 1/1989 | Wood |
| 4,893,849 A | | 1/1990 | Schlack |
| 4,913,475 A | | 4/1990 | Bushnell et al. |
| 4,949,563 A | | 8/1990 | Gerard et al. |
| 4,961,602 A | | 10/1990 | Pettersson |
| 4,962,653 A | | 10/1990 | Kaup |
| 4,962,800 A | | 10/1990 | Owiriwo |
| 4,964,660 A | | 10/1990 | Prevot et al. |
| 4,973,091 A | | 11/1990 | Paulson |
| 5,077,992 A | | 1/1992 | Su |
| 5,092,144 A | | 3/1992 | Fleming et al. |
| 5,096,237 A | * | 3/1992 | Hotzl ...................... E05C 9/026 292/DIG. 44 |
| 5,114,192 A | | 5/1992 | Toledo |
| 5,118,151 A | | 6/1992 | Nicholas, Jr. et al. |
| 5,125,703 A | | 6/1992 | Clancy et al. |
| 5,148,691 A | | 9/1992 | Wallden |
| 5,171,050 A | | 12/1992 | Mascotte |
| 5,172,944 A | | 12/1992 | Munich et al. |
| 5,184,852 A | | 2/1993 | O'Brien |
| 5,193,861 A | | 3/1993 | Juga |
| 5,197,771 A | | 3/1993 | Kaup et al. |
| 5,257,841 A | | 11/1993 | Geringer |
| 5,265,452 A | | 11/1993 | Dawson et al. |
| 5,290,077 A | | 3/1994 | Fleming |
| 5,364,138 A | | 11/1994 | Dietrich |
| 5,373,716 A | | 12/1994 | MacNeil et al. |
| 5,382,060 A | | 1/1995 | O'Toole et al. |
| 5,388,875 A | | 2/1995 | Fleming |
| 5,394,718 A | | 3/1995 | Hotzi |
| 5,404,737 A | | 4/1995 | Hotzl |
| 5,441,315 A | | 8/1995 | Kleefeldt |
| 5,456,503 A | | 10/1995 | Russell et al. |
| 5,482,334 A | | 1/1996 | Hotzl |
| 5,495,731 A | | 3/1996 | Riznik |
| 5,496,082 A | | 3/1996 | Zuckerman |
| 5,498,038 A | | 3/1996 | Simon |
| 5,513,505 A | | 5/1996 | Danes |
| 5,516,160 A | | 5/1996 | Kajuch |
| 5,524,941 A | | 6/1996 | Fleming |
| 5,524,942 A | | 6/1996 | Fleming |
| 5,531,086 A | | 7/1996 | Bryant |
| 5,544,924 A | | 8/1996 | Paster |
| 5,546,777 A | | 8/1996 | Liu |
| 5,603,534 A | | 2/1997 | Fuller |
| 5,609,372 A | | 3/1997 | Ponelle |
| 5,620,216 A | | 4/1997 | Fuller |
| 5,628,216 A | | 5/1997 | Qureshi |
| 5,707,090 A | | 1/1998 | Sedley |
| 5,716,154 A | | 2/1998 | Miller et al. |
| 5,722,704 A | | 3/1998 | Chaput et al. |
| 5,728,108 A | | 3/1998 | Griffiths et al. |
| 5,735,559 A | | 4/1998 | Frolov |

(56) References Cited

U.S. PATENT DOCUMENTS 5,757,269 A 5/1998 Roth
5,782,114 A 7/1998 Zeus et al.
5,791,179 A 8/1998 Brask
5,791,700 A 8/1998 Biro
5,820,170 A 10/1998 Clancy
5,820,173 A 10/1998 Fuller
5,825,288 A 10/1998 Wojdan
5,865,479 A 2/1999 Viney
5,878,606 A 3/1999 Chaput et al.
5,890,753 A 4/1999 Fuller
5,896,763 A 4/1999 Dinkelborg et al.
5,901,989 A 5/1999 Becken et al.
5,906,403 A 5/1999 Bestler et al.
5,911,460 A 6/1999 Hawkins
5,911,763 A 6/1999 Quesada
5,915,764 A 6/1999 MacDonald
5,918,916 A 7/1999 Kajuch
5,931,430 A 8/1999 Palmer
5,946,956 A 9/1999 Hotzl
5,951,068 A 9/1999 Strong et al.
5,979,199 A 11/1999 Elpern
6,050,115 A 4/2000 Schroter et al.
6,079,585 A 6/2000 Lentini
6,089,058 A 7/2000 Elpern
6,094,869 A 8/2000 Magoon et al.
6,094,952 A 8/2000 Clark
6,098,433 A 8/2000 Manaici
6,112,563 A 9/2000 Ramos
6,116,067 A 9/2000 Myers
6,119,538 A 9/2000 Chang
6,120,071 A 9/2000 Picard
D433,916 S 11/2000 Frey
6,145,353 A 11/2000 Doucet
6,147,622 A 11/2000 Fonea
6,148,650 A 11/2000 Kibble
6,152,498 A * 11/2000 Lindqvist .............. E05C 9/1875 292/96
6,174,004 B1 1/2001 Picard et al.
6,196,599 B1 3/2001 D'Hooge
6,209,931 B1 4/2001 Von Stoutenborough et al.
6,217,087 B1 4/2001 Fuller
6,250,842 B1 6/2001 Kruger
6,257,030 B1 7/2001 Davis, III et al.
6,264,252 B1 7/2001 Clancy
6,266,981 B1 * 7/2001 von Resch .......... E05B 63/0056 70/110
6,282,929 B1 9/2001 Eller et al.
6,283,516 B1 9/2001 Viney
6,293,598 B1 9/2001 Rusiana
6,318,769 B1 11/2001 Kang
6,327,881 B1 * 12/2001 Grundler ............... E05C 9/1841 70/109
6,389,855 B2 5/2002 Renz et al.
6,441,735 B1 8/2002 Marko
6,443,506 B1 9/2002 Su
6,453,616 B1 9/2002 Wright
6,454,322 B1 9/2002 Su
6,457,751 B1 10/2002 Hartman
6,490,895 B1 12/2002 Weinerman
6,502,435 B2 1/2003 Watts et al.
6,516,641 B1 2/2003 Segawa
6,517,127 B1 2/2003 Lu et al.
6,540,268 B2 4/2003 Pauser
6,564,596 B2 5/2003 Huang
6,568,726 B1 5/2003 Caspi
6,580,355 B1 6/2003 Milo
6,619,085 B1 9/2003 Hsieh
6,637,784 B1 10/2003 Hauber
6,672,632 B1 1/2004 Speed et al.
6,688,656 B1 2/2004 Becken
6,725,693 B2 4/2004 Yu et al.
6,733,051 B1 5/2004 Cowper
6,776,441 B2 8/2004 Liu
6,810,699 B2 11/2004 Nagy
6,813,916 B2 11/2004 Chang
6,871,451 B2 3/2005 Harger et al.
6,905,152 B1 6/2005 Hudson
6,929,293 B2 8/2005 Tonges
6,935,662 B1 8/2005 Hauber et al.
6,945,572 B1 9/2005 Hauber
6,962,377 B2 11/2005 Tonges
6,971,686 B2 12/2005 Becken
6,994,383 B2 2/2006 Morris
7,000,959 B2 2/2006 Sanders
7,010,945 B2 3/2006 Yu
7,010,947 B2 3/2006 Milo
7,025,394 B1 4/2006 Hunt
7,032,418 B2 4/2006 Martin
7,052,054 B2 5/2006 Luker
7,083,206 B1 8/2006 Johnson
7,128,350 B2 10/2006 Eckerdt
7,152,441 B2 12/2006 Friar
7,155,946 B2 1/2007 Lee et al.
7,203,445 B2 4/2007 Uchida
7,207,199 B2 4/2007 Smith et al.
7,249,791 B2 7/2007 Johnson
7,261,330 B1 8/2007 Hauber
7,353,637 B2 4/2008 Harger et al.
7,354,081 B2 * 4/2008 Kondratuk .............. E05B 55/00 70/144
7,404,306 B2 7/2008 Walls et al.
7,410,194 B2 8/2008 Chen
7,418,845 B2 9/2008 Timothy
7,513,540 B2 4/2009 Hagemeyer et al.
7,526,933 B2 5/2009 Meekma
7,634,928 B2 12/2009 Hunt
7,637,540 B2 12/2009 Chiang
7,677,067 B2 3/2010 Riznik et al.
7,686,207 B1 3/2010 Jeffs
7,707,862 B2 5/2010 Walls et al.
7,726,705 B2 6/2010 Kim
7,735,882 B2 6/2010 Abdollahzadeh et al.
7,748,759 B2 7/2010 Chen
7,856,856 B2 12/2010 Shvartz
7,871,112 B2 * 1/2011 Kondratuk ............ E05B 63/042 292/137
7,878,034 B2 2/2011 Alber et al.
7,946,080 B2 5/2011 Ellerton
7,963,573 B2 6/2011 Blomqvist
8,079,240 B2 12/2011 Brown et al.
8,161,780 B1 4/2012 Hum
8,182,002 B2 5/2012 Fleming
8,186,189 B2 * 5/2012 Brisco ........................ E05B 5/00 70/99
8,325,039 B2 12/2012 Picard
8,348,308 B2 1/2013 Hagemeyer et al.
8,376,414 B2 2/2013 Nakanishi et al.
8,376,415 B2 2/2013 Uyeda
8,382,166 B2 2/2013 Hagemeyer et al.
8,382,168 B2 2/2013 Carabalona
8,398,126 B2 3/2013 Nakanishi et al.
8,403,376 B2 3/2013 Greiner
8,494,680 B2 7/2013 Sparenberg et al.
8,550,506 B2 10/2013 Nakanishi
8,556,304 B2 * 10/2013 Chung .................... E05B 55/06 292/137
8,567,631 B2 10/2013 Brunner
8,628,126 B2 1/2014 Hagemeyer et al.
8,646,816 B2 2/2014 Dziurdzia
8,702,131 B1 4/2014 Gianoli
8,839,562 B2 9/2014 Madrid
8,840,153 B2 9/2014 Juha
8,850,744 B2 10/2014 Bauman et al.
8,851,532 B2 10/2014 Gerninger
8,876,172 B2 11/2014 Denison
8,899,635 B2 12/2014 Nakanishi
8,922,370 B2 12/2014 Picard
8,939,474 B2 1/2015 Hagemeyer et al.
9,057,210 B2 6/2015 Dumas et al.
9,196,104 B2 11/2015 Dumas et al.
9,218,696 B2 12/2015 Dumas et al.
9,428,937 B2 8/2016 Tagtow et al.
9,482,035 B2 11/2016 Wolf
9,512,654 B2 12/2016 Armari et al.

(56) References Cited

U.S. PATENT DOCUMENTS

| | | | | |
|---|---|---|---|---|
| 9,605,444 | B2 | 3/2017 | Rickenbaugh | |
| 9,637,957 | B2 | 5/2017 | Hagemeyer et al. | |
| 9,758,997 | B2 | 9/2017 | Hagemeyer et al. | |
| 9,765,550 | B2 | 9/2017 | Hemmingsen et al. | |
| 9,790,716 | B2 | 10/2017 | Hagemeyer et al. | |
| 9,822,552 | B2 | 11/2017 | Eller et al. | |
| 10,087,656 | B1 | 10/2018 | Cannella | |
| 10,174,522 | B2 | 1/2019 | Denison | |
| 10,240,366 | B2 | 3/2019 | Sotes Delgado | |
| 10,246,914 | B2 | 4/2019 | Sieglaar | |
| 10,273,718 | B2 | 4/2019 | Cannella | |
| 10,400,477 | B2 | 9/2019 | Moon | |
| 10,487,544 | B2 | 11/2019 | Ainley | |
| 10,662,675 | B2 | 5/2020 | Tagtow | |
| 10,738,506 | B2 | 8/2020 | Holmes | |
| 10,808,424 | B2 | 10/2020 | Criddle | |
| 10,822,836 | B2 | 11/2020 | Nakasone | |
| 10,968,661 | B2 | 4/2021 | Tagtow | |
| 11,021,892 | B2 | 6/2021 | Tagtow | |
| 11,066,850 | B2 | 7/2021 | Welbig | |
| 11,441,333 | B2 | 9/2022 | Tagtow | |
| 11,634,931 | B2 | 4/2023 | Tagtow | |
| 11,661,771 | B2 | 5/2023 | Lammers | |
| 11,686,134 | B2 * | 6/2023 | De Barros | E05C 9/02 292/48 |
| 11,834,866 | B2 | 12/2023 | Lammers | |
| 12,104,409 | B2 * | 10/2024 | Jaskiewicz | E05B 63/08 |
| 12,146,344 | B2 * | 11/2024 | Jaskiewicz | E05B 63/08 |
| 2002/0104339 | A1 | 8/2002 | Saner | |
| 2003/0024288 | A1 | 2/2003 | Gokcebay et al. | |
| 2003/0159478 | A1 | 8/2003 | Nagy | |
| 2004/0003633 | A1 | 1/2004 | Alexander | |
| 2004/0004360 | A1 | 1/2004 | Huang | |
| 2004/0011094 | A1 | 1/2004 | Hsieh | |
| 2004/0066046 | A1 | 4/2004 | Becken | |
| 2004/0089037 | A1 | 5/2004 | Chang | |
| 2004/0107746 | A1 | 6/2004 | Chang | |
| 2004/0107747 | A1 | 6/2004 | Chang | |
| 2004/0112100 | A1 | 6/2004 | Martin | |
| 2004/0145189 | A1 | 7/2004 | Liu | |
| 2004/0227349 | A1 | 11/2004 | Denys | |
| 2004/0239121 | A1 | 12/2004 | Morris | |
| 2005/0029345 | A1 | 2/2005 | Waterhouse | |
| 2005/0044908 | A1 | 3/2005 | Min | |
| 2005/0050928 | A1 | 3/2005 | Frolov | |
| 2005/0103066 | A1 | 5/2005 | Botha et al. | |
| 2005/0144848 | A1 | 7/2005 | Harger et al. | |
| 2005/0166647 | A1 | 8/2005 | Walls | |
| 2005/0180562 | A1 | 8/2005 | Chiang | |
| 2005/0229657 | A1 | 10/2005 | Johansson et al. | |
| 2006/0043742 | A1 | 3/2006 | Huang | |
| 2006/0071478 | A1 | 4/2006 | Denys | |
| 2006/0076783 | A1 | 4/2006 | Tsai | |
| 2006/0150516 | A1 | 7/2006 | Hagemeyer | |
| 2006/0208509 | A1 | 9/2006 | Bodily | |
| 2007/0068205 | A1 | 3/2007 | Timothy | |
| 2007/0080541 | A1 | 4/2007 | Fleming | |
| 2007/0113603 | A1 | 5/2007 | Polster | |
| 2007/0170725 | A1 | 7/2007 | Speyer et al. | |
| 2007/0259551 | A1 | 11/2007 | Rebel | |
| 2008/0000276 | A1 | 1/2008 | Huang | |
| 2008/0001413 | A1 | 1/2008 | Lake | |
| 2008/0087052 | A1 | 4/2008 | Abdollahzadeh et al. | |
| 2008/0092606 | A1 | 4/2008 | Meekma | |
| 2008/0093110 | A1 | 4/2008 | Bagung | |
| 2008/0141740 | A1 | 6/2008 | Shvartz | |
| 2008/0150300 | A1 | 6/2008 | Harger et al. | |
| 2008/0156048 | A1 | 7/2008 | Topfer | |
| 2008/0156049 | A1 | 7/2008 | Topfer | |
| 2008/0157544 | A1 | 7/2008 | Phipps | |
| 2008/0178530 | A1 | 7/2008 | Ellerton et al. | |
| 2008/0179893 | A1 | 7/2008 | Johnson | |
| 2008/0184749 | A1 | 8/2008 | Alber et al. | |
| 2008/0191499 | A1 | 8/2008 | Stein | |
| 2008/0265587 | A1 * | 10/2008 | Nakanishi | E05B 63/042 292/26 |
| 2009/0064737 | A1 | 3/2009 | Fan | |
| 2009/0078011 | A1 | 3/2009 | Avni | |
| 2009/0218832 | A1 | 9/2009 | Mackle | |
| 2009/0314042 | A1 | 12/2009 | Fan | |
| 2009/0315669 | A1 | 12/2009 | Lang | |
| 2010/0107707 | A1 | 5/2010 | Viviano | |
| 2010/0154490 | A1 | 6/2010 | Hagemeyer et al. | |
| 2010/0213724 | A1 | 8/2010 | Uyeda | |
| 2010/0236302 | A1 | 9/2010 | Uyeda | |
| 2010/0313612 | A1 | 12/2010 | Eichenstein | |
| 2010/0327610 | A1 | 12/2010 | Nakanishi et al. | |
| 2011/0056254 | A1 | 3/2011 | Tsai | |
| 2011/0198867 | A1 | 8/2011 | Hagemeyer et al. | |
| 2011/0289987 | A1 | 12/2011 | Chiou et al. | |
| 2011/0314877 | A1 | 12/2011 | Fang | |
| 2012/0001443 | A1 | 1/2012 | Mitchell | |
| 2012/0146346 | A1 | 6/2012 | Hagemeyer et al. | |
| 2012/0235428 | A1 | 9/2012 | Blacklaws et al. | |
| 2012/0306220 | A1 | 12/2012 | Hagemeyer et al. | |
| 2013/0019643 | A1 | 1/2013 | Tagtow et al. | |
| 2013/0081251 | A1 | 4/2013 | Hultberg | |
| 2013/0140833 | A1 | 6/2013 | Hagemeyer et al. | |
| 2013/0152647 | A1 | 6/2013 | Terei et al. | |
| 2013/0167671 | A1 | 7/2013 | Huang | |
| 2013/0176107 | A1 | 7/2013 | Dumas et al. | |
| 2013/0200636 | A1 | 8/2013 | Hagemeyer et al. | |
| 2013/0234449 | A1 | 9/2013 | Dery et al. | |
| 2013/0276488 | A1 | 10/2013 | Haber | |
| 2014/0060127 | A1 | 3/2014 | Hemmingsen et al. | |
| 2014/0125068 | A1 | 5/2014 | Hagemeyer et al. | |
| 2014/0159387 | A1 | 6/2014 | Hagemeyer et al. | |
| 2014/0182343 | A1 | 7/2014 | Talpe | |
| 2014/0367978 | A1 | 12/2014 | Geringer | |
| 2015/0075233 | A1 | 3/2015 | Pluta | |
| 2015/0089804 | A1 | 4/2015 | Picard | |
| 2015/0114176 | A1 | 4/2015 | Bisang | |
| 2015/0170449 | A1 | 6/2015 | Chandler, Jr. | |
| 2015/0176311 | A1 | 6/2015 | Picard | |
| 2015/0252595 | A1 | 9/2015 | Hagemeyer et al. | |
| 2016/0083976 | A1 | 3/2016 | Rickenbaugh | |
| 2016/0094103 | A1 | 3/2016 | Lien | |
| 2016/0108650 | A1 | 4/2016 | Hagemeyer et al. | |
| 2016/0369525 | A1 | 12/2016 | Tagtow et al. | |
| 2017/0030112 | A1 * | 2/2017 | Kane | E05C 9/047 |
| 2018/0023320 | A1 | 1/2018 | McKibben | |
| 2018/0051478 | A1 | 2/2018 | Tagtow | |
| 2018/0051480 | A1 | 2/2018 | Tagtow | |
| 2018/0119462 | A1 | 5/2018 | Hagemeyer | |
| 2018/0155962 | A1 | 6/2018 | Mitchell et al. | |
| 2018/0298642 | A1 | 10/2018 | Tagtow | |
| 2018/0313116 | A1 | 11/2018 | Criddle | |
| 2019/0024437 | A1 | 1/2019 | Tagtow | |
| 2019/0032368 | A1 | 1/2019 | Welbig et al. | |
| 2019/0277062 | A1 | 9/2019 | Tagtow | |
| 2020/0141155 | A1 | 5/2020 | Lammers | |
| 2020/0149327 | A1 | 5/2020 | Lammers | |
| 2020/0354990 | A1 | 11/2020 | Tagtow | |
| 2020/0370338 | A1 | 11/2020 | Holmes | |
| 2025/0043603 | A1 | 2/2025 | Criddle | |
| 2025/0341122 | A1 | 11/2025 | Criddle | |

FOREIGN PATENT DOCUMENTS

| | | | |
|---|---|---|---|
| CN | 1243908 | | 2/2000 |
| CN | 2554288 | Y | 6/2003 |
| CN | 2595957 | Y | 12/2003 |
| CN | 2660061 | | 12/2004 |
| CN | 201031548 | Y | 3/2008 |
| CN | 202047652 | U | 11/2011 |
| CN | 108193950 | | 6/2018 |
| DE | 410964 | C | 3/1925 |
| DE | 942555 | C | 5/1956 |
| DE | 1002656 | | 2/1957 |
| DE | 1584112 | | 9/1969 |
| DE | 2639065 | | 3/1977 |
| DE | 3032086 | | 3/1982 |
| DE | 3836693 | | 5/1990 |

(56) References Cited

FOREIGN PATENT DOCUMENTS

| | | | | |
|---|---|---|---|---|
| DE | 9011216 | | 10/1990 | |
| DE | 4224909 | | 2/1993 | |
| DE | 3836693 | C2 * | 1/1996 | E05B 63/20 |
| DE | 3505379 | C2 * | 3/1996 | E05B 59/00 |
| DE | 29807860 | | 8/1998 | |
| DE | 20115378 | U1 | 11/2001 | |
| DE | 10253240 | | 5/2004 | |
| DE | 202012002743 | U1 | 4/2012 | |
| DE | 202013000920 | U1 | 4/2013 | |
| DE | 202013000921 | U1 | 4/2013 | |
| DE | 202013001328 | U1 | 5/2013 | |
| EP | 0007397 | A1 | 2/1980 | |
| EP | 0231042 | A2 | 8/1987 | |
| EP | 0268750 | | 6/1988 | |
| EP | 341173 | | 11/1989 | |
| EP | 359284 | | 3/1990 | |
| EP | 661409 | | 7/1995 | |
| EP | 792987 | | 9/1997 | |
| EP | 1106761 | | 6/2001 | |
| EP | 1283318 | | 2/2003 | |
| EP | 0798436 | B1 * | 8/2003 | E05C 9/1841 |
| EP | 1449994 | | 8/2004 | |
| EP | 1574642 | | 9/2005 | |
| EP | 1867817 | | 12/2007 | |
| EP | 2072723 | A2 * | 6/2009 | E05C 9/047 |
| EP | 2085544 | A1 * | 8/2009 | E05B 63/126 |
| EP | 2128362 | | 12/2009 | |
| EP | 2273046 | A2 | 1/2011 | |
| EP | 2339099 | A1 | 6/2011 | |
| EP | 2450509 | | 5/2012 | |
| EP | 2581531 | A1 | 4/2013 | |
| EP | 2584123 | A1 | 4/2013 | |
| EP | 2584124 | A2 | 4/2013 | |
| EP | 2845971 | | 3/2015 | |
| EP | 2998483 | | 3/2016 | |
| EP | 3091152 | A1 | 11/2016 | |
| FR | 363424 | | 7/1906 | |
| FR | 370890 | | 2/1907 | |
| FR | 21883 | E | 4/1921 | |
| FR | 703827 | A | 5/1931 | |
| FR | 1142316 | | 9/1957 | |
| FR | 1162406 | A | 9/1958 | |
| FR | 1201087 | | 12/1959 | |
| FR | 2339723 | | 8/1977 | |
| FR | 2342390 | | 9/1977 | |
| FR | 2344695 | | 10/1977 | |
| FR | 2502673 | | 10/1982 | |
| FR | 2753225 | | 3/1998 | |
| FR | 2848593 | | 2/2005 | |
| FR | 3017641 | | 8/2015 | |
| FR | 3096387 | | 11/2020 | |
| GB | 226170 | | 4/1925 | |
| GB | 264373 | A | 1/1927 | |
| GB | 583655 | | 12/1946 | |
| GB | 612094 | A | 11/1948 | |
| GB | 1498849 | | 1/1978 | |
| GB | 1575900 | | 10/1980 | |
| GB | 2051214 | | 1/1981 | |
| GB | 2076879 | | 12/1981 | |
| GB | 2115055 | A | 9/1983 | |
| GB | 2122244 | | 1/1984 | |
| GB | 2126644 | | 3/1984 | |
| GB | 2134170 | | 8/1984 | |
| GB | 2136045 | | 9/1984 | |
| GB | 2168747 | | 6/1986 | |
| GB | 2196375 | | 4/1988 | |
| GB | 2212849 | | 8/1989 | |
| GB | 2225052 | | 5/1990 | |
| GB | 2230294 | | 10/1990 | |
| GB | 2242702 | | 10/1991 | |
| GB | 2244512 | | 12/1991 | |
| GB | 2217770 | B * | 4/1992 | E05B 63/126 |
| GB | 2265935 | | 10/1993 | |
| GB | 2270343 | | 3/1994 | |
| GB | 2280474 | | 2/1995 | |
| GB | 2318382 | A | 4/1998 | |
| GB | 22364545 | | 1/2002 | |
| GB | 2430005 | A * | 3/2007 | E05B 63/0021 |
| GB | 2496911 | A | 5/2013 | |
| IT | 614960 | | 1/1961 | |
| JP | 64-083777 | | 3/1989 | |
| JP | H102135 | A * | 1/1998 | E05B 63/143 |
| JP | 2003343141 | | 12/2003 | |
| JP | 2006112042 | | 4/2006 | |
| JP | 2008002203 | | 1/2008 | |
| KR | 2011094706 | | 8/2011 | |
| NL | 8105627 | | 7/1983 | |
| SE | 309372 | | 3/1969 | |
| WO | 96/25576 | | 8/1996 | |
| WO | 97/41323 | | 11/1997 | |
| WO | 02/33202 | | 4/2002 | |
| WO | WO-2006119486 | A2 * | 11/2006 | E05B 55/12 |
| WO | 2007/104499 | | 9/2007 | |
| WO | 2009/059112 | | 5/2009 | |
| WO | 2010071886 | | 6/2010 | |
| WO | 2013/114409 | | 8/2013 | |
| WO | 2015/079290 | | 6/2015 | |
| WO | WO-2019202618 | A1 * | 10/2019 | E05B 63/0013 |
| WO | 2020/023652 | | 1/2020 | |

OTHER PUBLICATIONS

"Intercity Locks—For All Your Security Needs—Fast", http://www.directlocks.co.uk/locks-multipoint-locks-c-123_96.html?page=2&sort=2A, accessed Oct. 27, 2011, original publication date unknown, 3 pgs.

"Intercity Locks—For All Your Security Needs—Fast", http://www.directlocks.co.uk/locks-multipoint-locks-c-123_96.html?page=3&sort=2A, accessed Oct. 27, 2011, original publication date unknown, 3 pgs.

"LocksOnline.co.uk: Premier Supplier of Security Products", http://www.locksonline.co.uk/acatalog/Maco_multipoint_lock_2_cams_2_shootbolt_attachment.html, accessed Oct. 27, 2011, original publication date unknown, 5 pgs.

"LocksOnline.co.uk: Premier Supplier of Security Products", http://www.locksonline.co.uk/acatalog/upvc_Locks.html, accessed Oct. 27, 2011, original publication date unknown, 6 pgs.

"UPVC Window Hardware and uPVC Door Hardware online", http://www.upvc-hardware.co.uk/, accessed Oct. 27, 2011, original publication date unknown, 2 pgs.

Doorking.com—Electric Locks—Strikes and Deadbolts; printed from https://www.doorking.com/access-control/electricocks-strikes-deadbolts, 2 pages, Feb. 2016.

magneticlocks.net—Electric Strikes and Deadbolts; printed from https://www.magneticlocks.net/electric-strikes-and-deadbolts/electric-strikes.html, 8 pages, Feb. 2016.

sdcsecurity.com—Latch and Deadbolt Monitoring Strikes; printed from http://www.sdcsecurity.com/monitor-strike-kits2.htm, 2 pages, Feb. 2016.

* cited by examiner

REMOTE LOCK ASSEMBLY FOR USE WITH A MULTIPOINT LOCK SYSTEM

CROSS-REFERENCE TO RELATED APPLICATION(S)

This application claims priority to, and the benefit of, U.S. Provisional Patent Application No. 63/652,762, filed May 29, 2024, the disclosure of which is hereby incorporated by reference in its entirety.

INTRODUCTION

Multipoint lock systems generally have a plurality of locking points at spaced locations on a door. A central lock assembly can support a handle and a central retracting latch or bolt for locking. Additionally, one or more remote lock assemblies may be coupled to the central lock assembly and include one or more remote latches or bolts for locking. The remote lock assemblies are typically at least partially operated through the central lock assembly. These latches or bolts from the central lock assembly and the remote lock assemblies are located in the edge of the door and extend horizontally into the doorjamb and/or vertically into the head and/or sill of the door. Multipoint lock systems utilizing locking elements that extend into keepers on two or more planes (e.g., into a jamb, a sill, and/or a header) are more effective at securing a door than locks that extend into a single keeper on a single plane.

SUMMARY

In an aspect, the technology relates to a remote lock assembly for a multipoint lock system of a door including: a housing having a first end and an opposite second end defining a longitudinal axis, and a first side plate and a second side plate extending between the first end and the second end, the housing defining an interior cavity; a latch assembly disposed at a front face of the housing and configured to move between at least an extended position and a retracted position relative to the front face of the housing along a transverse axis orthogonal to the longitudinal axis; and a drive assembly disposed within the interior cavity of the housing and configured to operate the latch assembly, the drive assembly including: a slide plate selectively slidable along the longitudinal axis, the slide plate having a first end and an opposite second end, the slide plate defining an opening disposed between the first end and the second end of the slide plate; a sliding latch support coupled to the latch assembly and selectively slidable along the transverse axis, the sliding latch support having at least one protrusion extending through the opening of the slide plate and engaged with the housing; and a rotating latch arm pivotably coupled to the housing and having a nose end configured to engage with the sliding latch support and a tail end configured to engage with the second end of the slide plate, wherein the slide plate contacting the tail end of the rotating latch arm causes the nose end to slide the sliding latch support towards a rear end of the housing and move the latch assembly towards the retracted position.

In an example, the drive assembly further includes a rotating stop plate pivotably coupled to the housing and having a stop shoulder configured to engage with the sliding latch support and a slide engagement portion configured to engage with the first end of the slide plate, the slide plate contacting the slide engagement portion of the rotating stop plate causes the stop shoulder to be removed from a travel path of the sliding latch support. In another example, the drive assembly further includes a fixed latch support, the fixed latch support housing a biasing member configured to engage with the sliding latch support when the latch assembly is in the extended position. In yet another example, the drive assembly further includes at least one biasing member disposed between a rear face of the housing and the sliding latch support, the at least one biasing member biasing the latch assembly towards the extended position. In still another example, the opening defines a first region having a longitudinal length configured to enable the slide plate to move relative to the sliding latch support without moving the latch assembly and a second region having a transverse length configured to enable the sliding latch support to move relative to the slide plate.

In an example, a ramp edge at least partially defines the opening proximate the first end of the slide plate, the ramp edge at least partially rounded. In another example, the opening further defines a third region configured to receive the sliding latch support while the latch assembly is being manually pulled from the front face of the housing for changing the handing position of the latch assembly.

In another aspect, the technology relates to a remote lock assembly for a multipoint lock system of a door including: a housing having a first end and an opposite second end defining a longitudinal axis; a latch assembly disposed at a front face of the housing and configured move between at least an extended position and a retracted position relative to the front face of the housing along a transverse axis orthogonal to the longitudinal axis, the latch assembly biased toward the extended position; and a drive assembly disposed within the housing and configured to operate the latch assembly, the drive assembly including: a slide plate moveable along the longitudinal axis between at least a locked configuration and an unlocked configuration, the slide plate defining an opening; a sliding latch support coupled to the latch assembly and slidably supported by the housing along the transverse axis, the sliding latch support having at least one protrusion extending at least partially within the opening of the slide plate; and a rotating latch arm pivotably coupled to the housing, wherein: (a) when the slide plate is in the unlocked configuration, the sliding latch support is slidable along the transverse axis so that the latch assembly is moveable between the extended position and the retracted position; (b) when the slide plate moves from the unlocked configuration to the locked configuration, the opening is shaped and sized to enable the sliding latch support to position the latch assembly in the extended position; and (c) when the slide plate moves from the locked configuration to the unlocked configuration, the slide plate contacts the rotating latch arm to engage the sliding latch support and move the latch assembly towards the retracted position.

In an example, the drive assembly further includes a rotating stop plate pivotably coupled to the housing, and when the latch assembly is in the extended position, the rotating stop plate engages with the sliding latch support to prevent movement of the latch assembly towards the retracted position, and when the slide plate moves from the locked configuration to the unlocked configuration, the slide plate pivots the rotating stop plate out of engagement with the sliding latch support. In another example, when the latch assembly is in the extended position and the slide plate is in the locked configuration, the latch assembly is configured to be manually pulled from the front face of the housing and rotated relative to the sliding latch support so as to change a handing configuration of the latch assembly. In yet another example, the latch assembly includes a main body and a pivot arm, when the latch assembly is moved from the extended position to the retracted position via movement of the slide plate from the locked configuration to the unlocked configuration, the pivot arm is configured to engage with the housing so as to hold the latch assembly in a loaded configuration within the housing and only partially extending from the housing. In still another example, when an external force contacts the pivot arm of the latch assembly while in the loaded configuration, the latch assembly is configured to automatically fire into the extended position without movement of the slide plate.

In an example, the slide plate includes a first end and an opposite second end along the longitudinal axis, the first end and the second end of the slide plate both having a tab disposed proximate the front face of the housing, each tab configured to couple to a drive bar of the multipoint lock system. In another example, the rotating latch arm includes a tail end having a dimple configured to at least partially engage the slide plate when the slide plate is moving towards the unlocked configuration.

In another aspect, the technology relates to a multipoint lock system for a door including: a gearbox configured to slide at least one drive bar along a longitudinal axis; a face plate for an edge of the door and covering the at least one drive bar; and at least one remote lock assembly coupled to the at least one drive bar and including: a housing mounted to the face plate and defining an interior cavity; a latch assembly supported by the housing and configured move between at least an extended position and a retracted position relative to the face plate along a transverse axis orthogonal to the longitudinal axis; and a drive assembly disposed within the interior cavity of the housing and configured to operate the latch assembly, the drive assembly including: a slide plate selectively slidable along the longitudinal axis via the at least one drive bar, the slide plate having a first end coupled to the at least one drive bar and an opposite second end, the slide plate defining an opening disposed between the first end and the second end of the slide plate; a sliding latch support coupled to the latch assembly and selectively slidable along the transverse axis, the sliding latch support having at least one protrusion extending through the opening of the slide plate and engaged with the housing; and a rotating latch arm pivotably coupled to the housing and having a nose end configured to engage with the sliding latch support and a tail end configured to engage with the second end of the slide plate, wherein the slide plate contacting the tail end of the rotating latch arm causes the nose end to slide the sliding latch support towards a rear end of the housing and move the latch assembly towards the retracted position.

In an example, the at least one drive bar is a first drive bar and the multipoint lock system includes a second drive bar slidable along the longitudinal axis and coupled to the second end of the slide plate of the at least one remote lock assembly, the second drive bar operationally coupled to a shoot bolt. In another example, the latch assembly includes a main body and a pivot arm, the main body having an oblique surface defining a handing configuration of the latch assembly and the pivot arm having a distal end with a taper that corresponds to the oblique surface of the main body. In yet another example, the slide plate is moveable along the longitudinal axis between at least a locked configuration and an unlocked configuration, and the opening of the slide plate is configured to: (a) when the latch assembly is in the extended position, enable the slide plate to independently slide towards the locked configuration from the unlocked configuration; (b) move the latch assembly towards the retracted position when the slide plate slides from the locked configuration towards the unlocked configuration; and (c) when the latch assembly is in an intermediate loaded configuration, enable the latch assembly to move towards the extended position while the slide plate is in the unlocked configuration. In still another example, the opening of the side plate is further configured to (d) when the latch assembly is in the extended position and the slide plate is in the locked configuration, allow the latch assembly to be pulled at least partially out of the housing and its handing configuration reversed.

In an example, the drive assembly further includes a rotating stop plate pivotably coupled to the housing, and when the latch assembly is in the extended position, the rotating stop plate engages with the sliding latch support to prevent movement of the latch assembly towards the retracted position.

BRIEF DESCRIPTION OF THE DRAWINGS

There are shown in the drawings, examples that are presently preferred, it being understood, however, that the technology is not limited to the precise arrangements and instrumentalities shown.

DETAILED DESCRIPTION

A remote lock assembly is described below and includes a housing with a latch assembly configured to extend and retract therefrom. A latch drive assembly is disposed within the housing and facilitates operation of the latch assembly. The latch drive assembly includes a slide plate that couples to a drive bar of a multipoint lock system so that the remote lock assembly is operationally coupled to a central lock assembly that has a handle, thumb turn, and/or key cylinder which drives movement of the drive bar and the slide plate. The slide plate may also be coupled to a second drive bar so as to drive operation of a shoot bolt located at the top and/or bottom of the door.

Sliding movement of the slide plate via the drive bar is configured to extend and retract the latch assembly from the housing. The latch assembly is also biased towards the extended position so that the latch assembly is configured to auto-fire into the extended position. By including an auto-fire latch assembly on the remote lock assembly, the latch assembly can automatically be extended into a keeper as the door swings closed and without operation from the central lock assembly. For example, the latch assembly is held in a loaded, partially extended position after retraction so that a projecting tip of the latch assembly contacts the keeper during door closing for release and automatic extension. Accordingly, the slide plate is configured to enable the latch assembly to auto-fire from the housing and without movement of the slide plate. In some examples, the latch assembly may not completely auto-fire into the keeper due to latch assembly and keeper tolerances. In such situations, movement of the slide plate is configured to engage the latch assembly and urge the latch assembly to a fully extended position.

The slide plate is also configured to enable the latch assembly to change handing positions for different door swing configurations. The latch assembly has an oblique surface that is configured to contact the keeper during closing. In the example, the latch assembly is configured to be manually pulled partially out of the housing, rotated 180 degrees, and set back into the housing so as to change the orientation of the oblique surface. The coupling between the slide plate and the latch assembly allows for such latch assembly rotation without driving operation from the central lock assembly and movement of the slide plate.

Figure 1:
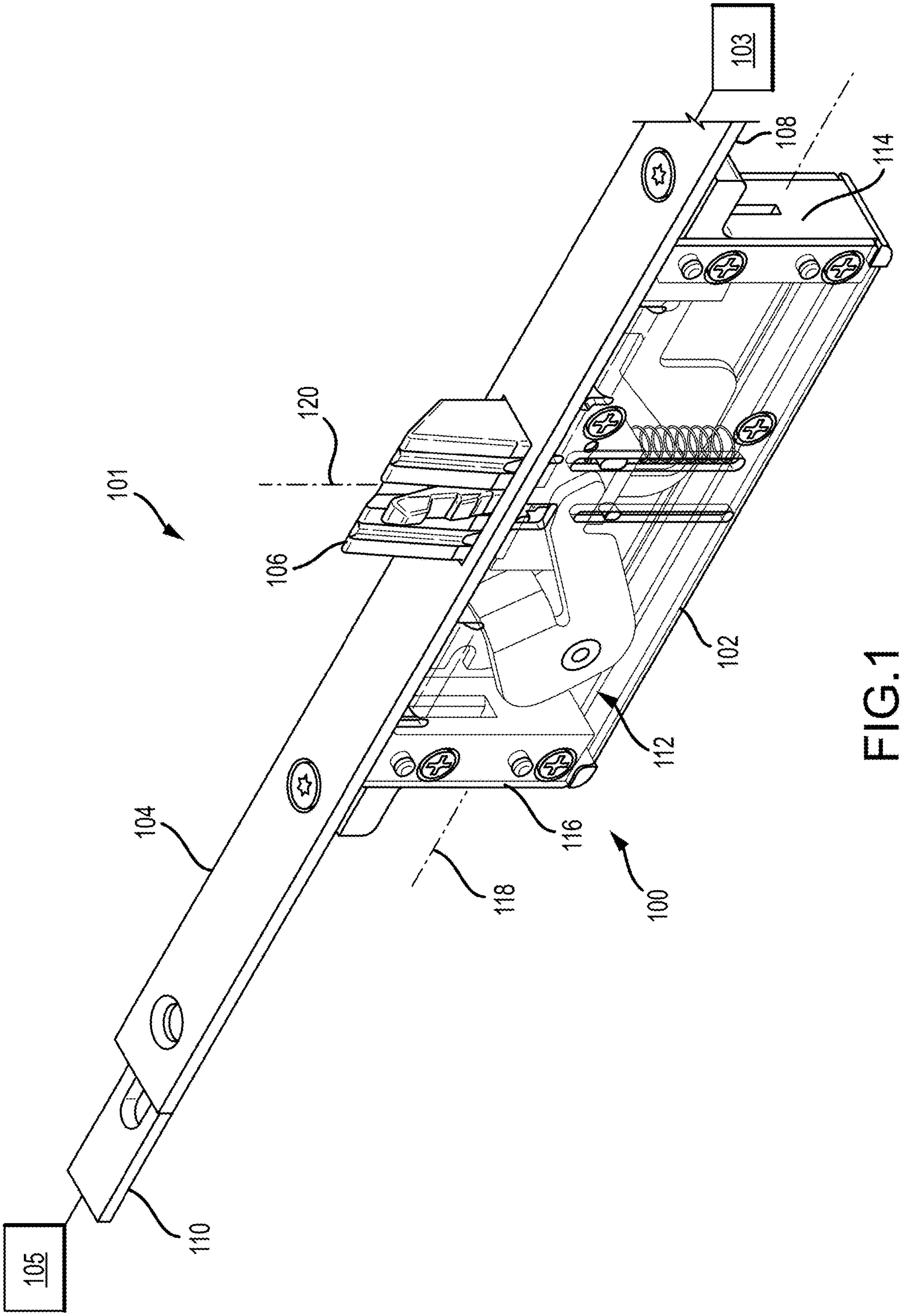
FIG. 1 is a perspective view of a remote lock assembly within a schematic of a multipoint lock system.

FIG. 1 is a perspective view of a remote lock assembly 100 within a schematic of a multipoint lock system 101. The remote lock assembly 100 includes a housing 102 configured to be mortised within an edge of a door and illustrated as partially transparent so that the components housed therein are visible, a face plate 104 that mounts along the edge of the door, and a latch assembly 106 configured to move between at least an extended position and a retracted position relative to the face plate 104 and engage a corresponding keeper (not shown) within a jamb of the door. The multipoint lock system 101 includes one or more drive bars 108, 110 that couple to the remote lock assembly 100, covered by the face plate 104, and enable operation of the remote lock assembly 100 as described herein.

In the multipoint lock system 101, the first drive bar 108 is operationally coupled to a central lock assembly 103 that is configured to drive movement of the first drive bar 108. The central lock assembly 103 may include one or more of a deadbolt, latch, key cylinder, thumb turn, and handle that enables operation of the multipoint lock system 101. In an example, the central lock assembly 103 includes a handle and internal gearbox components that transfer rotational movement of the handle to linear movement of the first drive bar 108 and for operation of the remote lock assembly 100. The central lock assembly 103 may also be known as a gearbox. The second drive bar 110 may operationally be coupled to a secondary remote lock 105. In the example, the secondary remote lock 105 may be a shoot bolt assembly that is configured to extend and retract a shoot bolt from the top or bottom of the door and upon sliding movement of the second drive bar 110. In aspects, the secondary remote lock 105 may not be included in the multipoint lock system 101.

As illustrated in FIG. 1, the housing 102 of the remote lock assembly 100 is transparent so that a latch drive assembly 112 is visible therein. The latch drive assembly 112 is configured to facilitate operation of the latch assembly 106 and the second drive bar 110 as described herein. The housing 102 has a first end 114 and an opposite second end 116 defining a longitudinal axis 118. The first end 114 is a gearbox end and faces in a direction towards the central lock assembly 103 that has a handle (not shown). A s such, the first drive bar 108 extends between the first end 114 of the housing 102 and the central lock assembly 103 and is configured to longitudinally move along the longitudinal axis 118. The second drive bar 110 extends from the second end 116 of the housing 102. In the example, the second drive bar 110 is configured to support a shoot bolt of the secondary remote lock 105 and can longitudinally move along the longitudinal axis 118. The latch assembly 106 extends and retracts along a transverse axis 120 that is substantially orthogonal to the longitudinal axis 118. While the second drive bar 110 is described herein, it is appreciated that the latch drive assembly 112 can operate the latch assembly 106 without the second drive bar 110 connected thereto and the remote lock assembly 100 only has transverse latch functionality.

In the example, the remote lock assembly 100 is configured for use in the multipoint lock system 101. The multipoint lock system 101 includes the central lock assembly 103, the remote lock assembly 100, and the secondary remote lock 105 forming a three-point locking system. In other examples, a first remote lock assembly may be positioned above the central lock assembly 103 and a second remote lock assembly may be positioned below the central lock assembly 103 when installed on the door. In this configuration, each remote lock assembly includes the latch assembly 106 and a secondary remote lock 105 so that the multipoint lock system 101 forms a five-point locking system. It is appreciated that the multipoint lock system 101 may include fewer locking points as required or desired. For example, the secondary remote lock 105 may not be included for the remote lock assembly 100.

As illustrated in FIG. 1, the latch assembly 106 is in its extended position and which corresponds to a locked configuration of the remote lock assembly 100. In operation, when the first drive bar 108 is pulled away from the first end 114 of the housing 102 and towards the central lock assembly 103, the latch drive assembly 112 is configured to move the latch assembly 106 towards a retracted position and which corresponds to an unlocked configuration of the remote lock assembly 100. In the example, the latch drive assembly 112 also facilitates the latch assembly 106 having an auto-fire configuration that allows for the latch assembly 106 to be positioned in a loaded configuration. In the loaded configuration, a tip of the latch assembly 106 is partially extended from the housing 102 so that as the door swings closed, the latch assembly 106, via a trigger of the latch assembly, contacts the corresponding keeper and this external force releases the latch assembly 106 from the loaded configuration to automatically fire the latch assembly 106 towards the extended position and engagement with the keeper.

Figure 2:
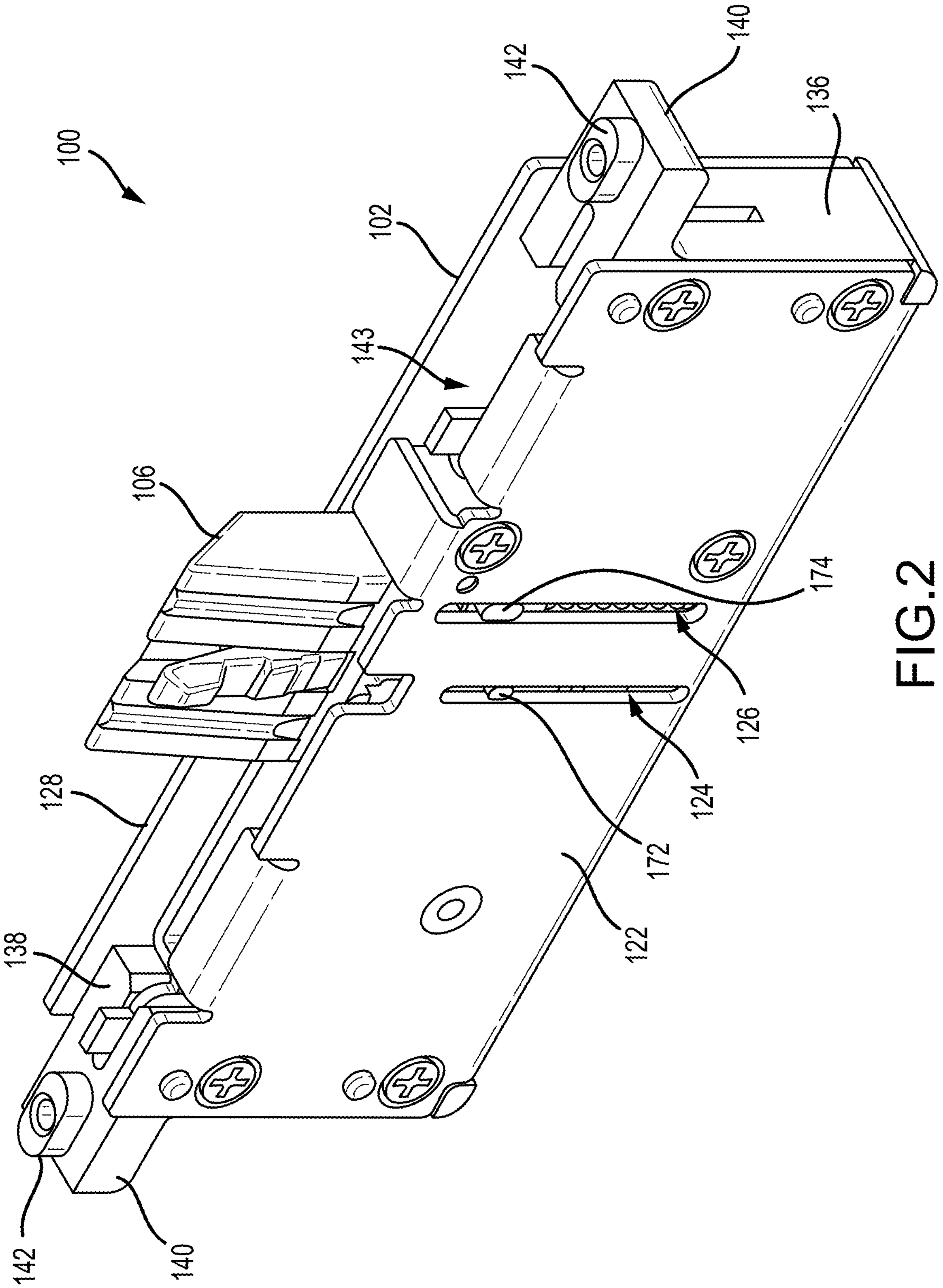
FIGS. 2 and 3 are perspective views of the remote lock assembly of FIG. 1 including a housing and a latch assembly.
Figure 3:
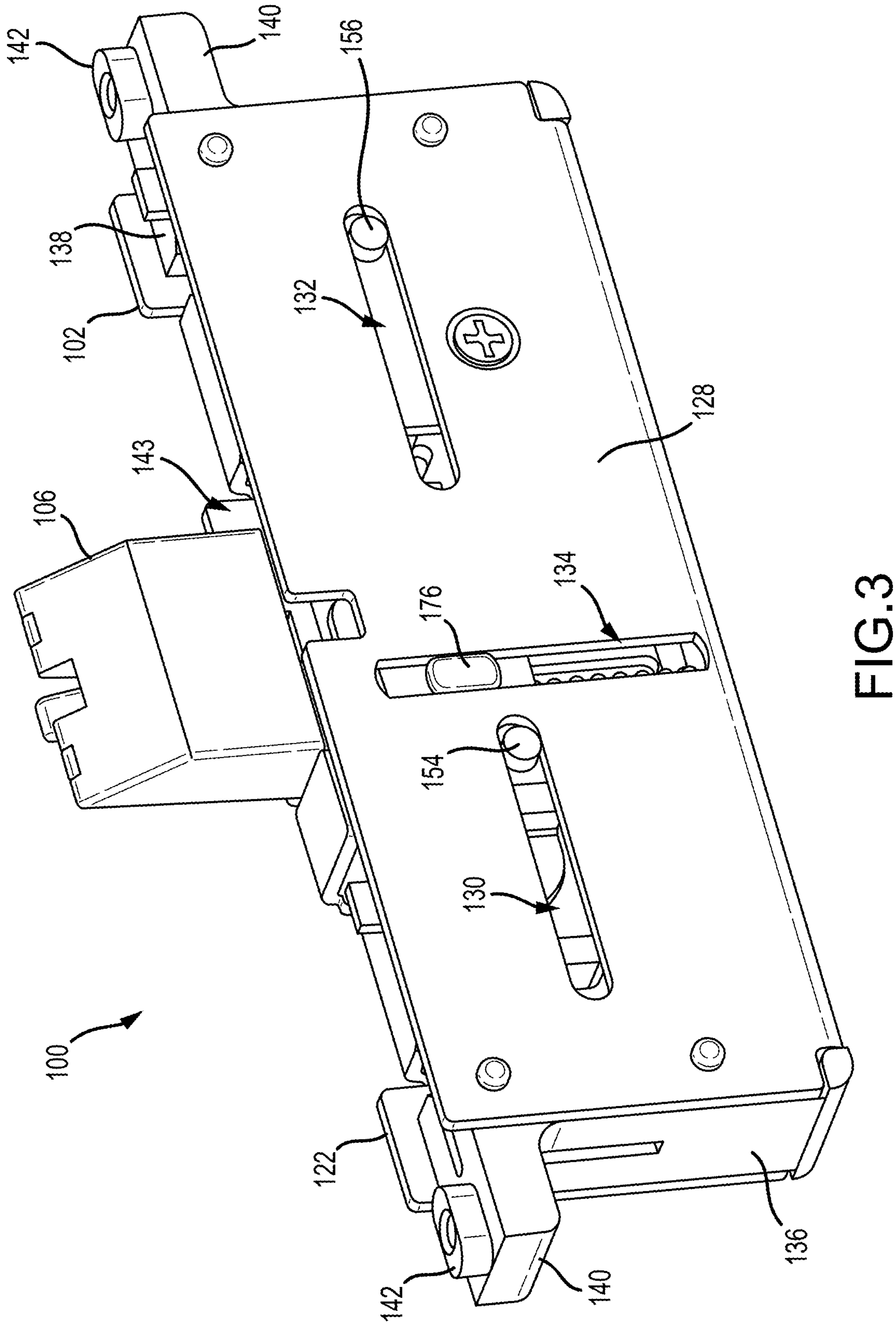

FIGS. 2 and 3 are perspective views of the remote lock assembly 100 including the housing 102 and the latch assembly 106. The housing 102 has a first side plate 122 that defines a first transverse slot 124 and a second transverse slot 126. The slots 124, 126 are parallel to each other, extend along the transverse axis 120 (shown in FIG. 1), and are spaced apart from each other along the longitudinal axis 118 (shown in FIG. 1). The housing 102 also has a second side plate 128 that defines a first longitudinal slot 130 and a second longitudinal slot 132. The slots 130, 132 are parallel to each other, extend along the longitudinal axis 118, and spaced apart from each other along the transverse axis 120. The second side plate 128 also defines a third transverse slot 134 that extends along the transverse axis 120 and disposed between the slots 130, 132.

The housing 102 also includes a first end cap 136 and an opposite second end cap 138. Each end cap 136, 138 includes a shoulder 140 facing the face plate 104 (shown in FIG. 1) and having a lug 142. The lug 142 of each end cap 136, 138 is slidingly engaged with the corresponding drive bar 108, 110 (shown in FIG. 1) so that the ends of the drive bars 108, 110 can extend into an interior cavity 143 defined by the housing 102. The latch assembly 106 is disposed at a front face of the housing 102 proximate the face plate 104 (shown in FIG. 1).

Figure 4:
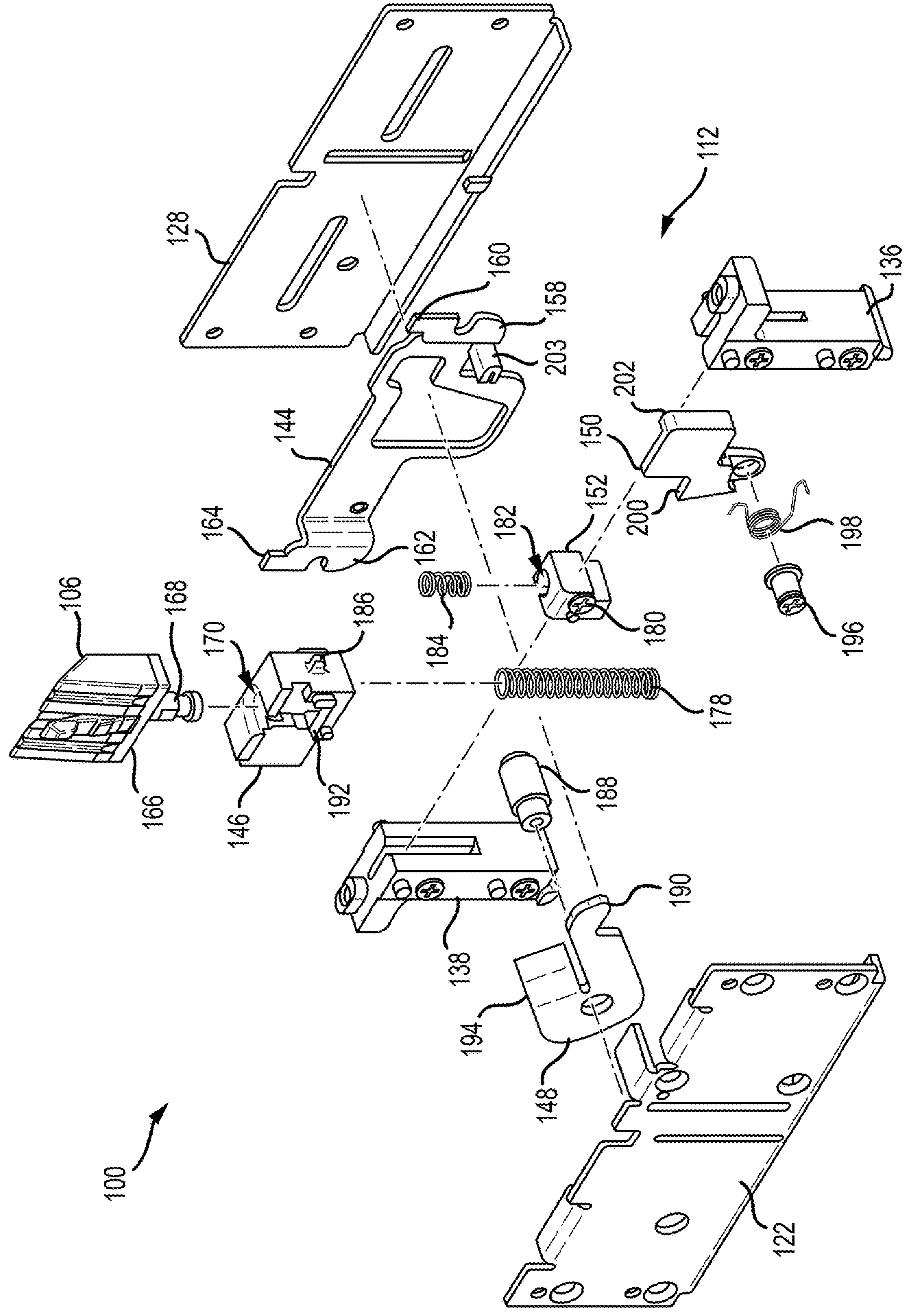
FIG. 4 is an exploded perspective view of the remote lock assembly of FIGS. 2 and 3.

FIG. 4 is an exploded perspective view of the remote lock assembly 100 shown in FIGS. 2 and 3. The first and second side plates 122, 128 and the first and second end caps 136, 138 of the housing 102 (shown in FIGS. 2 and 3) house the latch drive assembly 112. The latch drive assembly 112 includes a slide plate 144, a sliding latch support 146, a rotating latch arm 148, a rotating stop plate 150, and a fixed latch support 152. The slide plate 144 has projections 154, 156 (shown in FIG. 3) that slidingly engage with the longitudinal slots 130, 132 in the second side plate 128. As such, the slide plate 144 is configured to move in a longitudinal direction along the longitudinal axis 118 (shown in FIG. 1) and without rotation within the housing 102. A first end 158 of the slide plate 144 includes a tab 160 so that the slide plate 144 couples to the first drive bar 108 (shown in FIG. 1) and movement of the first drive bar 108 directly drives movement of the slide plate 144. A second end 162 of the slide plate 144 also includes a tab 164 so that the slide plate 144 couples to the second drive bar 110 (shown in FIG. 1) and movement of the slide plate 144 drives movement of the second drive bar 110.

The latch assembly 106 is coupled to a base 166 with a post 168 extending therefrom. The post 168 is received within the sliding latch support 146. The sliding latch support 146 defines a recess 170 to receive the post 168. The sliding latch support 146 also includes projections 172, 174, 176. First and second projections 172, 174 slidingly engage with transverse slots 124, 126 of the first side plate 122 as illustrated in FIG. 2 and to restrict rotation of the sliding latch support 146 relative to the housing 102. Third projection 176 slidingly engages with transverse slot 134 of the second side plate 128 as illustrated in FIG. 3 and also to restrict rotation of the sliding latch support 146 relative to the housing 102. The sliding latch support 146 is configured to move only in the transverse direction along the transverse axis 120 (shown in FIG. 1) so as to extend and retract the latch assembly 106. The latch assembly 106 is biased towards an extended position with a biasing member 178 (e.g., compression spring) disposed between the sliding latch support 146 and a rear face of the housing 102.

The fixed latch support 152 is fixedly coupled to the housing 102 via a fastener 180. The fixed latch support 152 includes a recess 182 that receives a biasing member 184 (e.g., compression spring). The bottom end of the biasing member 184 is engaged with a fin 186 extending from the sliding latch support 146. The biasing member 184 biases the latch assembly 106 in a transverse direction relative to the housing 102 and into the interior cavity. In the example, the latch assembly 106 is reversible with a pull and twist operation. The latch assembly 106 includes an oblique surface that enables the latch assembly 106 to be automatically pushed towards a retracted position when the door is swinging closed and via contact with the keeper. To enable different door swinging directions for different door hanging and handing positions, the latch assembly 106 can be manually pulled at least partially outward from the housing 102 along the transverse axis 120 while overcoming the biasing member 184. The operator then manually rotates the latch assembly 106 around the transverse axis 120 and relative to the sliding latch support 146 so as to change the position of the oblique surface. The post 168 does not pull out of the recess 170 of the sliding latch support 146 during rotation of the latch assembly 106. When the latch assembly 106 is released, the biasing member 184 pulls the latch assembly 106 at least partially back into the housing 102. This outward movement of the latch assembly 106 relative to the housing 102 is because the base 166 needs to clear the housing 102 and the face plate 104 (shown in FIG. 1) for the rotation of the latch assembly 106 into different handing orientations.

The rotating latch arm 148 is pivotably supported within the housing 102 by a pivot pin 188. The rotating latch arm 148 includes a nose end 190 that engages with a shelf 192 defined by the sliding latch support 146. A tail end 194 selectively engages with the second end 162 of the slide plate 144. The rotating stop plate 150 is also pivotably supported within the housing 102 by a pivot pin 196. The rotating stop plate 150 is biased by a biasing member 198 (e.g., a torsion spring). The rotating stop plate 150 includes a stop shoulder 200 that prevents the sliding latch support 146 from sliding along the transverse axis 120 when in the travel path thereof. The rotating stop plate 150 also includes a slide engagement portion 202 that selectively engages with the first end 158 of the slide plate 144 at an extension 203.

Figure 5:
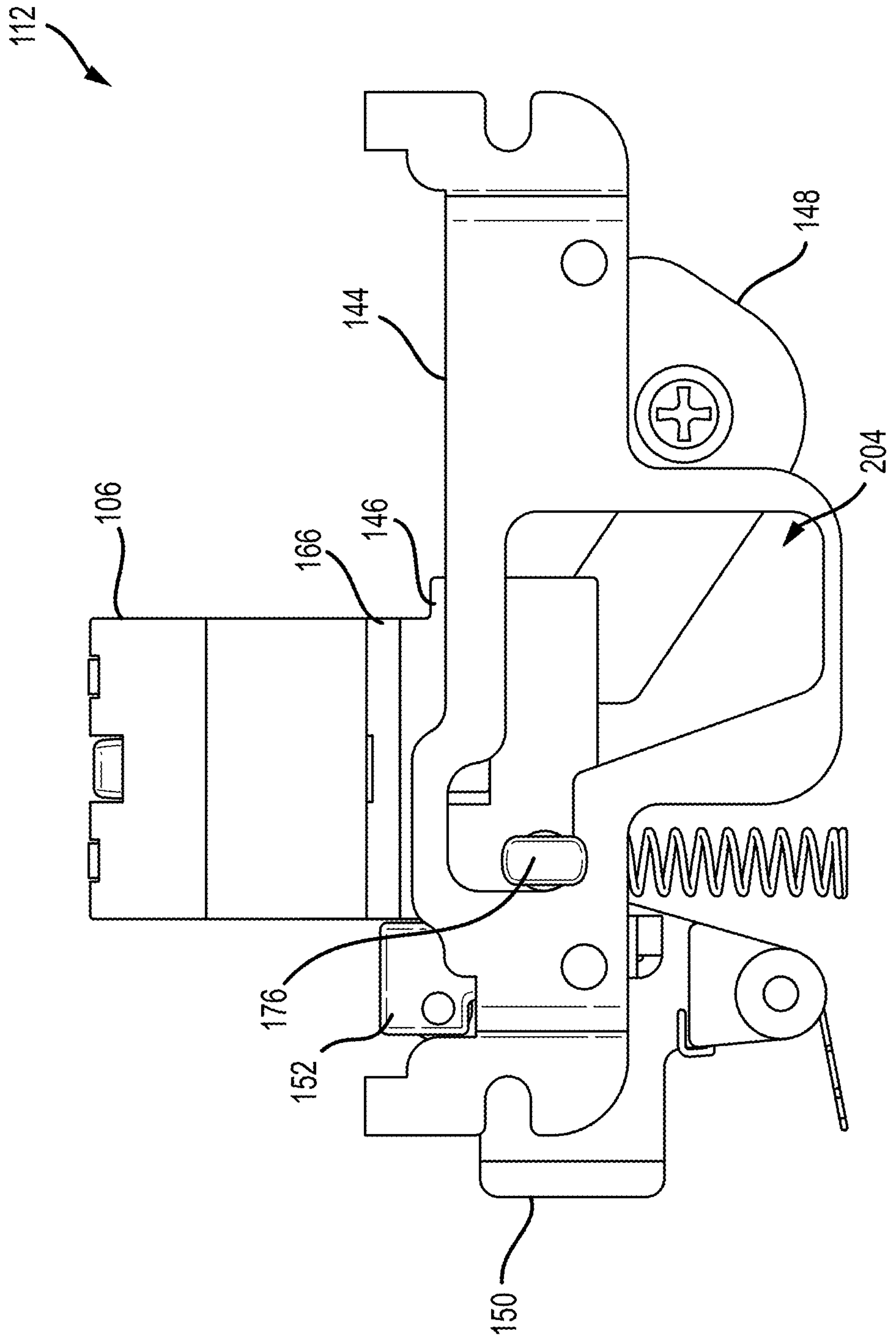
FIGS. 5 and 6 are side views of a latch drive assembly in a locked configuration.
Figure 6:
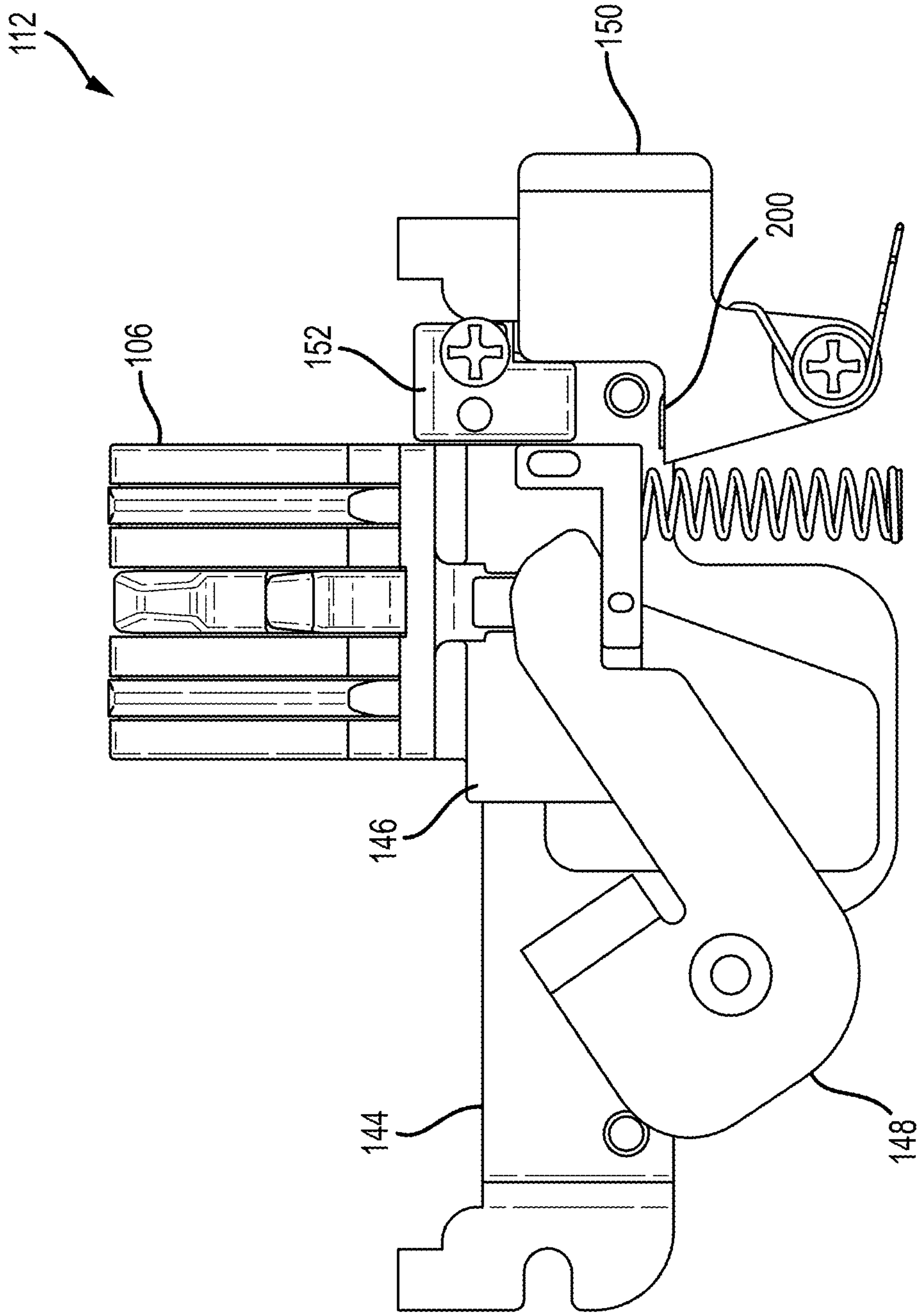

FIGS. 5 and 6 are side views of the latch drive assembly 112 in a locked configuration. In the locked configuration, the latch assembly 106 is in its extended position relative to the housing 102 (shown in FIGS. 2 and 3) and blocked from being retracted into the housing 102 via the rotating stop plate 150 and the slide plate 144. The slide plate 144 is positioned towards the second end cap 138 of the housing (shown in FIGS. 2 and 3) so that the attached shoot bolt can also be in an extended position relative to the housing 102 and via the second drive bar 110.

The slide plate 144 defines an opening 204 that is disposed between the first and second ends 158, 162. The opening 204 is shaped and sized to at least partially receive the projection 176 of the sliding latch support 146. The projection 176 is also engaged with the housing 102 and at the transverse slot 134. The opening 204 and the slot 134 corporate to facilitate movement of the latch assembly 106 as described herein.

Figure 7:
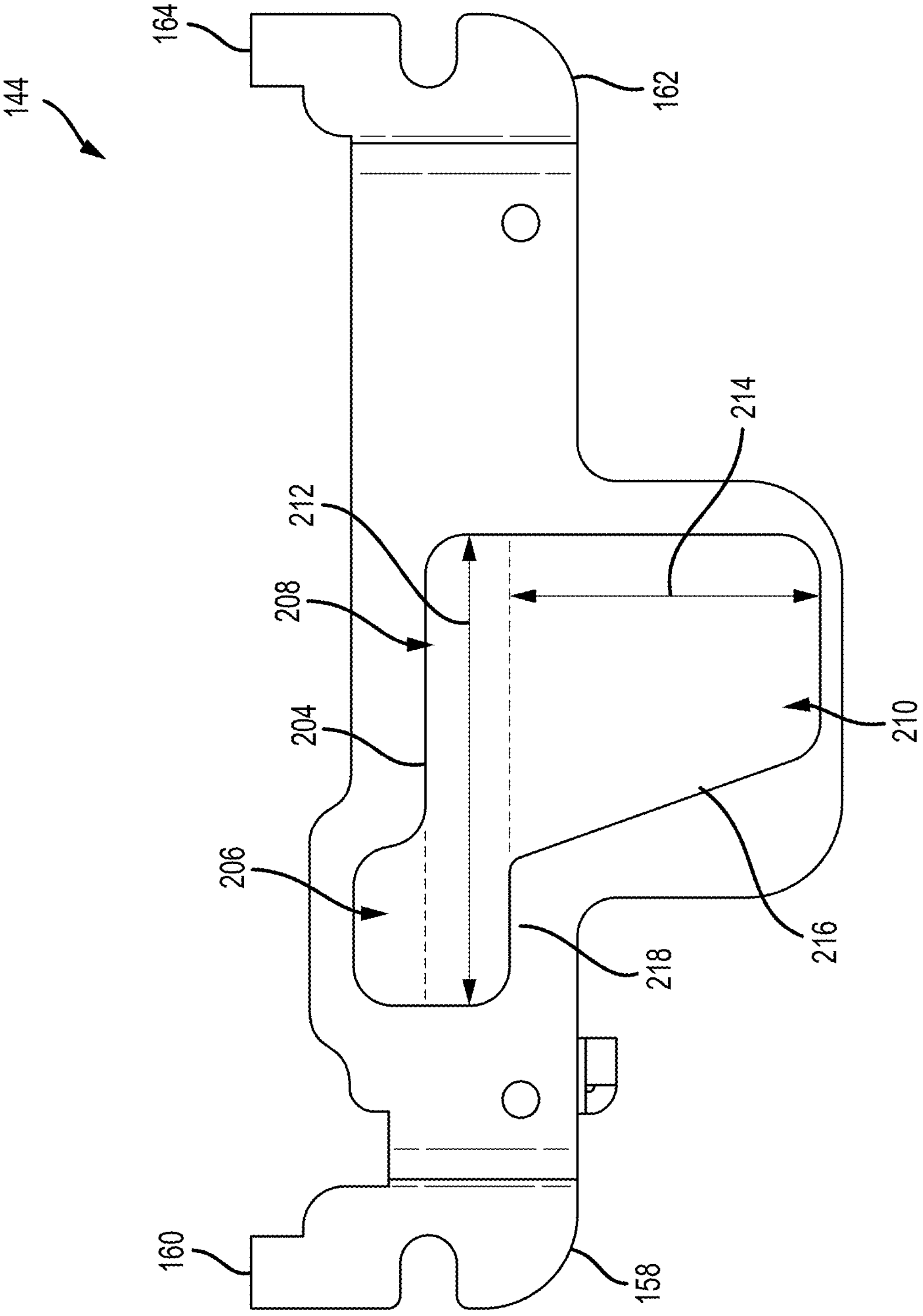
FIG. 7 is a side view of a slide plate of the latch drive assembly shown in FIG. 4.

As shown in FIG. 7, the opening 204 of the slide plate 144 is shaped to define a latch reversing region 206, an intermediate region 208, and a latch extension/retraction region 210 relative to the transverse axis 120 (shown in FIG. 1). The intermediate region 208 has a longitudinal length 212 along the longitudinal axis 118 (shown in FIG. 1) that is longer than both of the other regions. The latch extension/retraction region 210 has a transverse length 214 along the transverse axis 120 that is longer than both of the other regions. A ramp edge 216 at least partially defines the latch extension/retraction region 210 and extends at an oblique angle relative to the longitudinal axis 118 and transverse axis 120. The ramp edge 216 is disposed below the intermediate region 208 and proximate the first end 158 of the slide plate 144. A stop edge 218 at least partially defines the intermediate region 208 and extends from the ramp edge 216. The stop edge 218 is parallel to the longitudinal axis 118. The opening 204 is shaped and sized to enable the latch assembly 106 to auto-fire and change handing positions without movement of the slide plate 144, however, when the slide plate 144 does move, the slide plate 144 facilitates extension or retraction of the latch assembly 106.

Turning back to FIGS. 5 and 6, the projection 176 is disposed within the intermediate region 208 of the opening 204 and blocked from retraction movement within the housing 102 via the stop edge 218. Additionally, the stop shoulder 200 of the rotating stop plate 150 is in a blocking position relative to the sliding latch support 146. This configuration of the latch drive assembly 112 locks the extended position of the latch assembly 106 until the slide plate 144 is moved.

From the locked configuration, the latch assembly 106 can be manually pulled at least partially outward from the housing 102 and its orientation reversed as required or desired for lock handing. In this operation, the projection 176 moves into the latch reversing region 206 within the opening 204. The fin 186 (shown in FIG. 4) of the sliding latch support 146 transversely slides within the fixed latch support 152 and is biased so that when the latch assembly 106 is pulled out, the latch assembly 106 is automatically pulled back into the extended position as illustrated. The sliding latch support 146 is restricted from being pulled completely out of the housing 102 for the reversing operation. The base 166 needs to be clear of the housing 102 and face plate 104 (shown in FIG. 1) so that the latch assembly 106 can rotate relative to the sliding latch support 146.

In order to unlock the latch assembly 106, the central lock assembly 103 (shown in FIG. 1) is operated so as to pull the first drive bar 108 towards the central lock assembly 103 and to longitudinal move the slide plate 144 towards the first end cap 136 of the housing 102 (shown in FIG. 2).

Figure 8:
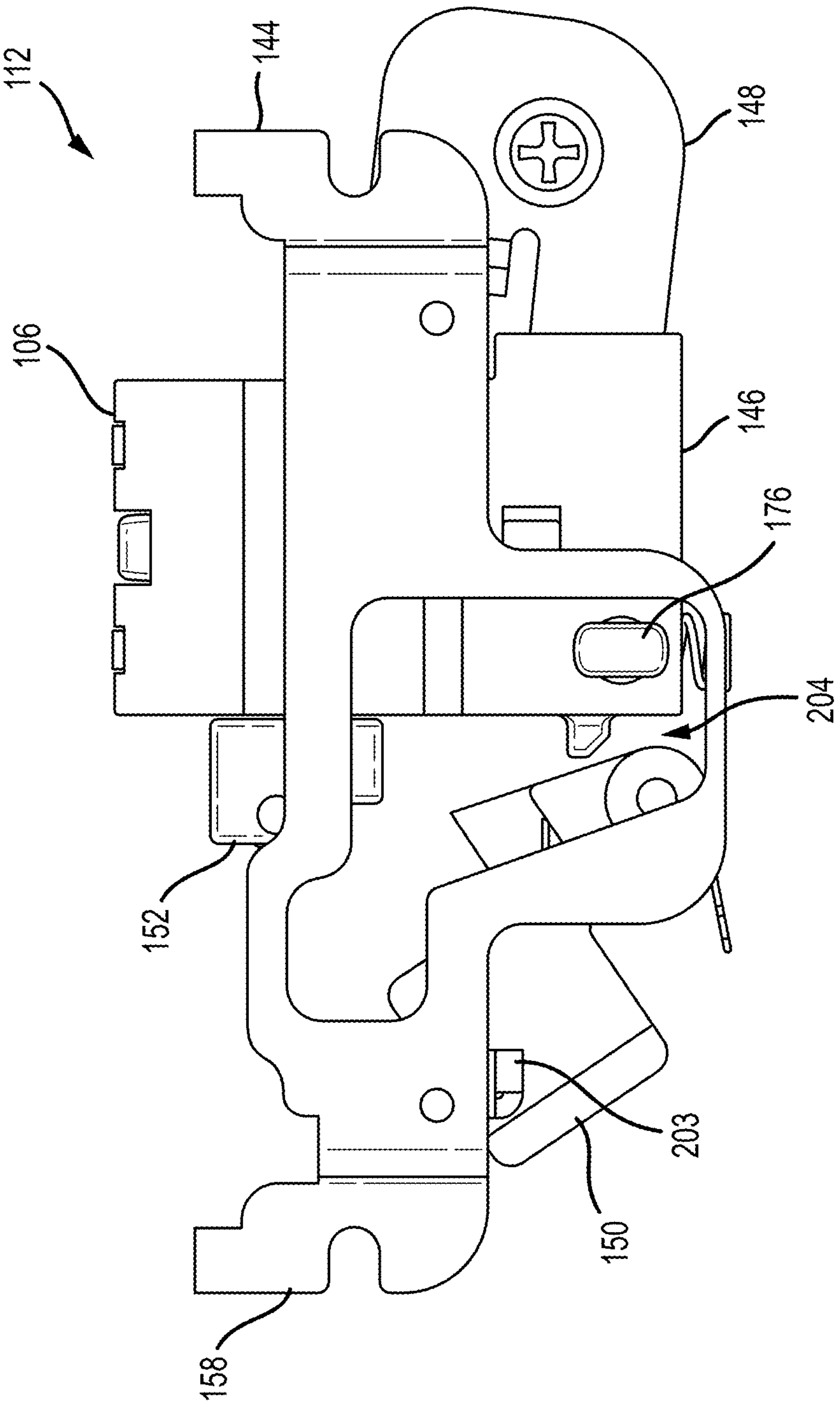
FIGS. 8 and 9 are side views of the latch drive assembly in an unlocked configuration.
Figure 9:
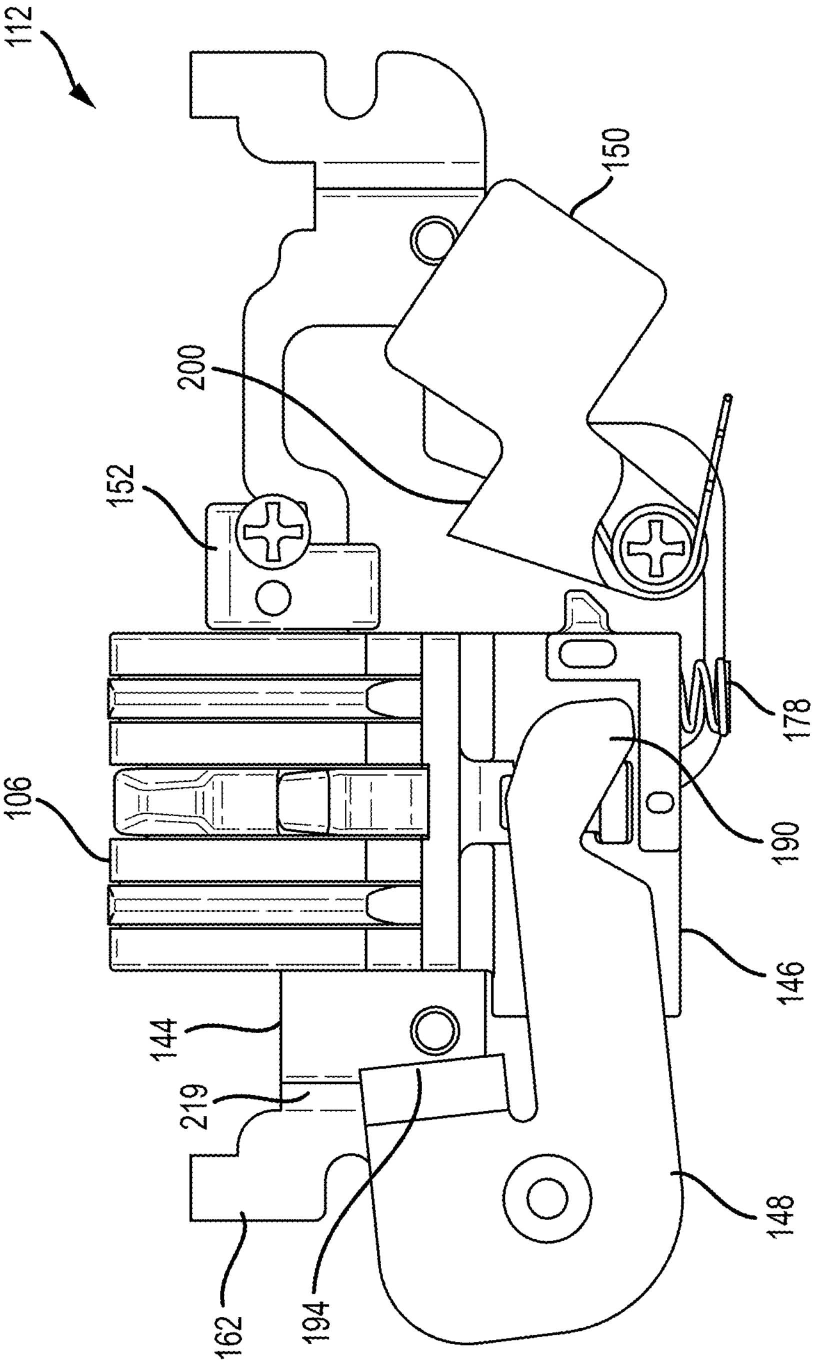

FIGS. 8 and 9 are side views of the latch drive assembly 112 in an unlocked configuration. Upon movement of the slide plate 144 towards the first end cap 136 (shown in FIGS. 2 and 3), the first end 158 of the slide plate 144 via the extension 203 causes the rotating stop plate 150 to rotate towards the first end cap 134 and move out of the way of the sliding latch support 146. Additionally, the second end 162 of the slide plate 144 via a transverse wall 219 contacts the tail end 194 of the rotating latch arm 148 and causes the rotating latch arm 148 to rotate so that the nose end 190 pushes on and retracts the sliding latch support 146 into the housing 102 and towards a rear end with the latch assembly 106 moving towards the retracted position. The latch extension/retraction region 210 (shown in FIG. 7) of the opening 204 of the slide plate 144 facilitates allowing the retraction movement of the sliding latch support 146. With the latch assembly 106 retracted, the door is unlocked and can swing open.

The latch assembly 106 is also biased toward the extended position via the biasing member 178. Accordingly, the latch assembly 106 will be urged to return to the extended position once the latch assembly 106 is retracted and the unlocked configuration of the latch drive assembly 112 is not holding the retracted position of the latch assembly 106. The biasing member 178 will urge the sliding latch support 146 towards the front face of the housing 102 and the latch extension/retraction region 210 of the opening is elongated in the longitudinal direction so that as the slide plate 144 returns to the locked configuration the latch assembly 106 moves toward the extended position.

In the example, the latch assembly 106 is also configured to facilitate an auto-fire operation, whereby the latch assembly 106, via a pivot arm of the latch assembly 106, engages the face plate 104 and is held is a partially extended position (e.g., a loaded configuration). The pivot arm can then be released when the door swings closed and the latch assembly 106 slides against the corresponding keeper. This interaction between the latch assembly 106 and the keeper triggers the full extension of the latch assembly 106 into the keeper automatically. By auto-firing the latch assembly 106, security of the multipoint lock system 101 (shown in FIG. 1) is increased because the remote lock assembly 100 can engage with the keeper without the central lock assembly 103 being actuated.

Figure 10:
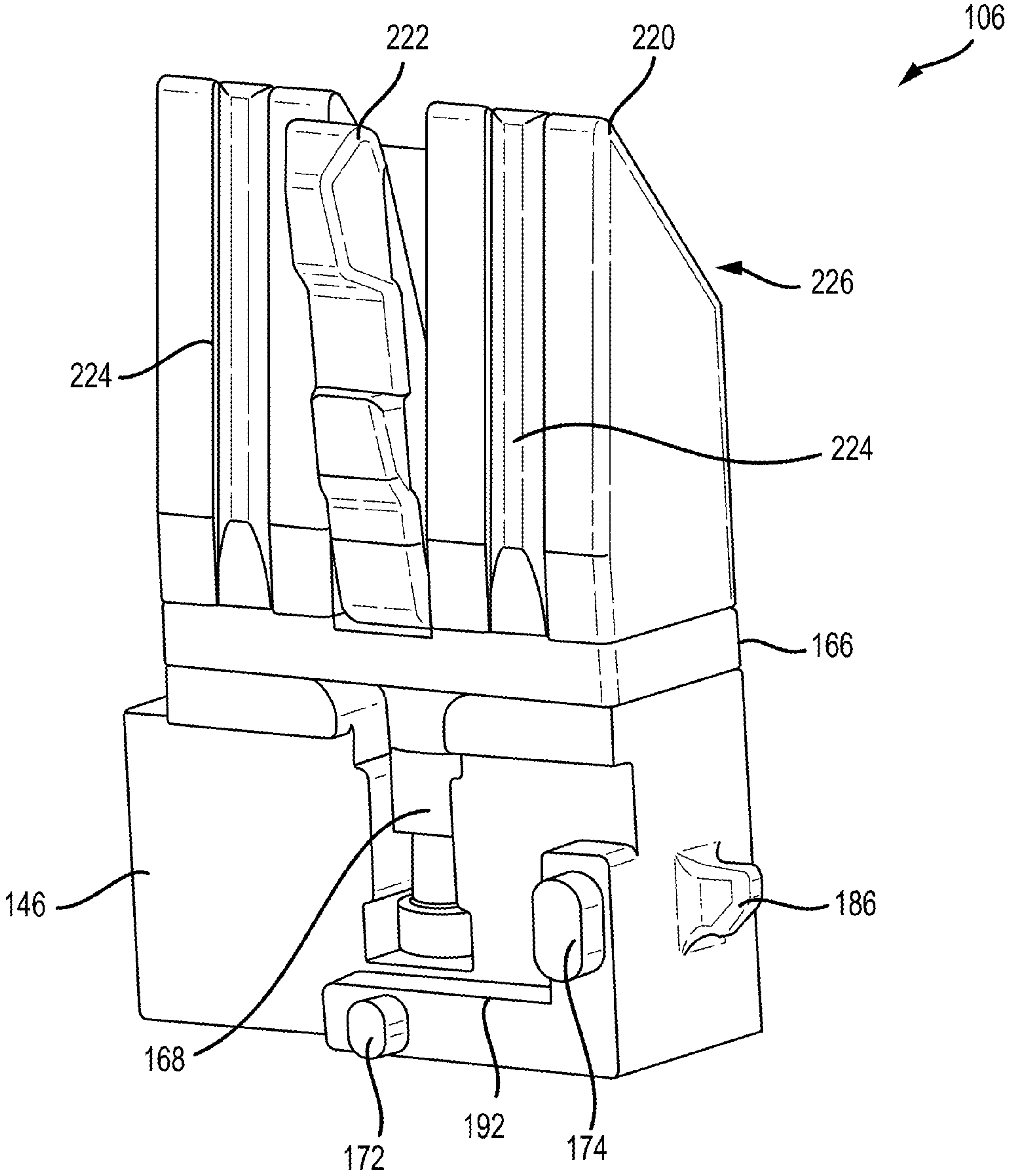
FIGS. 10 and 11 are perspective views of the latch assembly.
Figure 11:
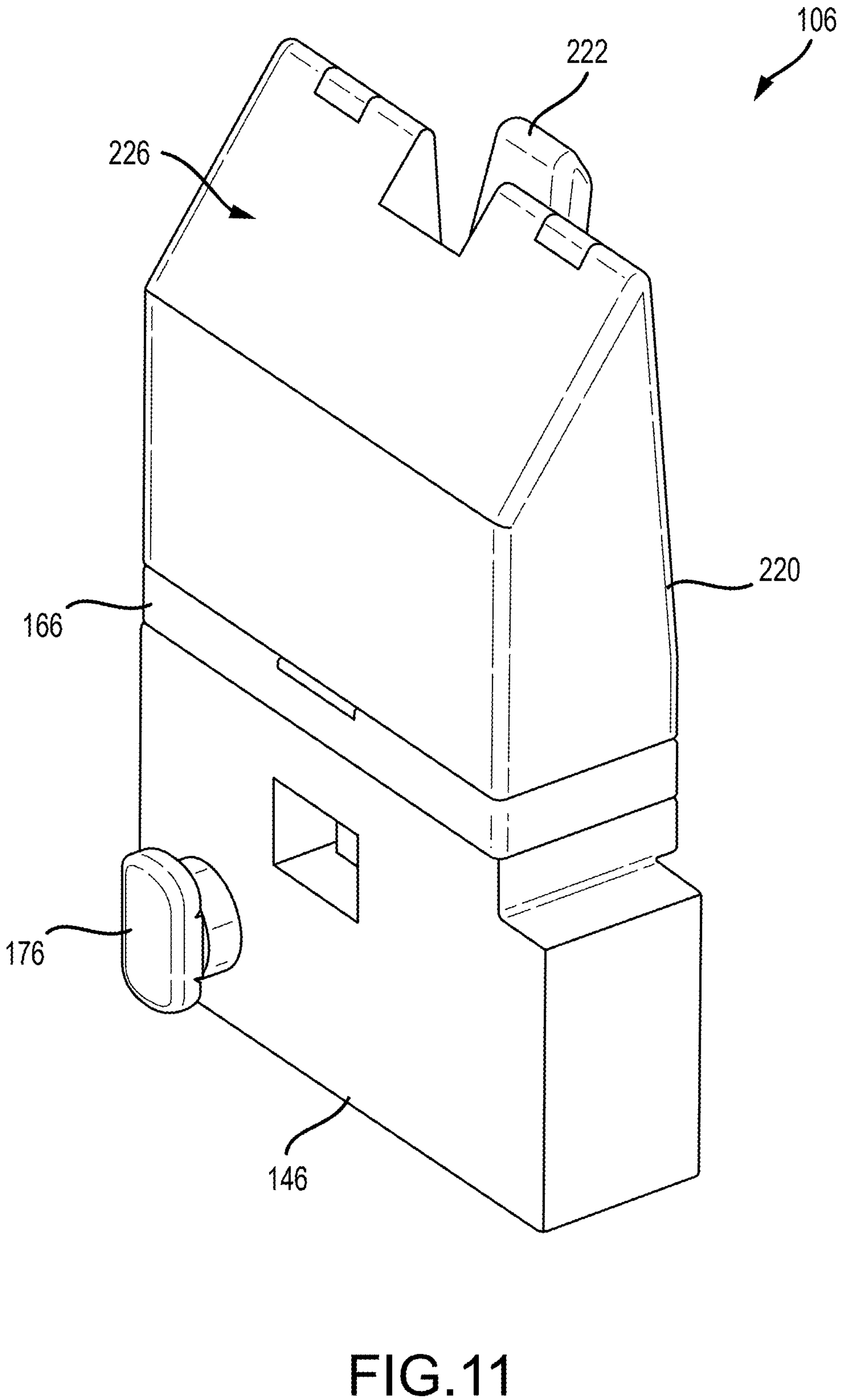

FIGS. 10 and 11 are perspective views of the latch assembly 106. The latch assembly 106 includes a main latch body 220 and a pivot arm 222 that is spring biased towards an outer extended position (as illustrated) relative to the main latch body 220. The pivot arm 222 is configured to engage with the face end of the housing 102 and/or face plate 104 (shown in FIGS. 1-3) and capture the latch assembly 106 in a loaded configuration. In examples, the main latch body 220 may include one or more wear strips 224 (e.g., elastomeric material to reduce scuffs on the corresponding keeper). In the example, the wear strips 224 are adjacent the pivot arm 222. The main latch body 220 is mounted on the base 166 that is coupled to the sliding latch support 146 via the post 168. The post 168 is rotatable within the recess 170 of the sliding latch support 146 so as to change handing orientation of an oblique surface 226 of the latch assembly 106. The post 168 has an enlarged distal end head so that the latch assembly 106 cannot be pulled out of the recess 170. Instead, to assemble the post 168 within the recess 170, the post 168 is transversely received within the recess 170.

The sliding latch support 146 includes the shelf 192 that is configured to engage with the nose end 190 of the rotating latch arm 148 (shown in FIG. 4) for retracting the latch assembly 106 as described above. The projections 172, 174 extend from the shelf 192. The fin 186 extends from a sidewall of the sliding latch support 146. Additionally, the projection 176 that is disposed within the opening 204 of the slide plate 144 (shown in FIG. 7) is substantially T-shaped for receipt within the housing 102 and selective engagement with the opening 204 as described herein.

Figure 12:
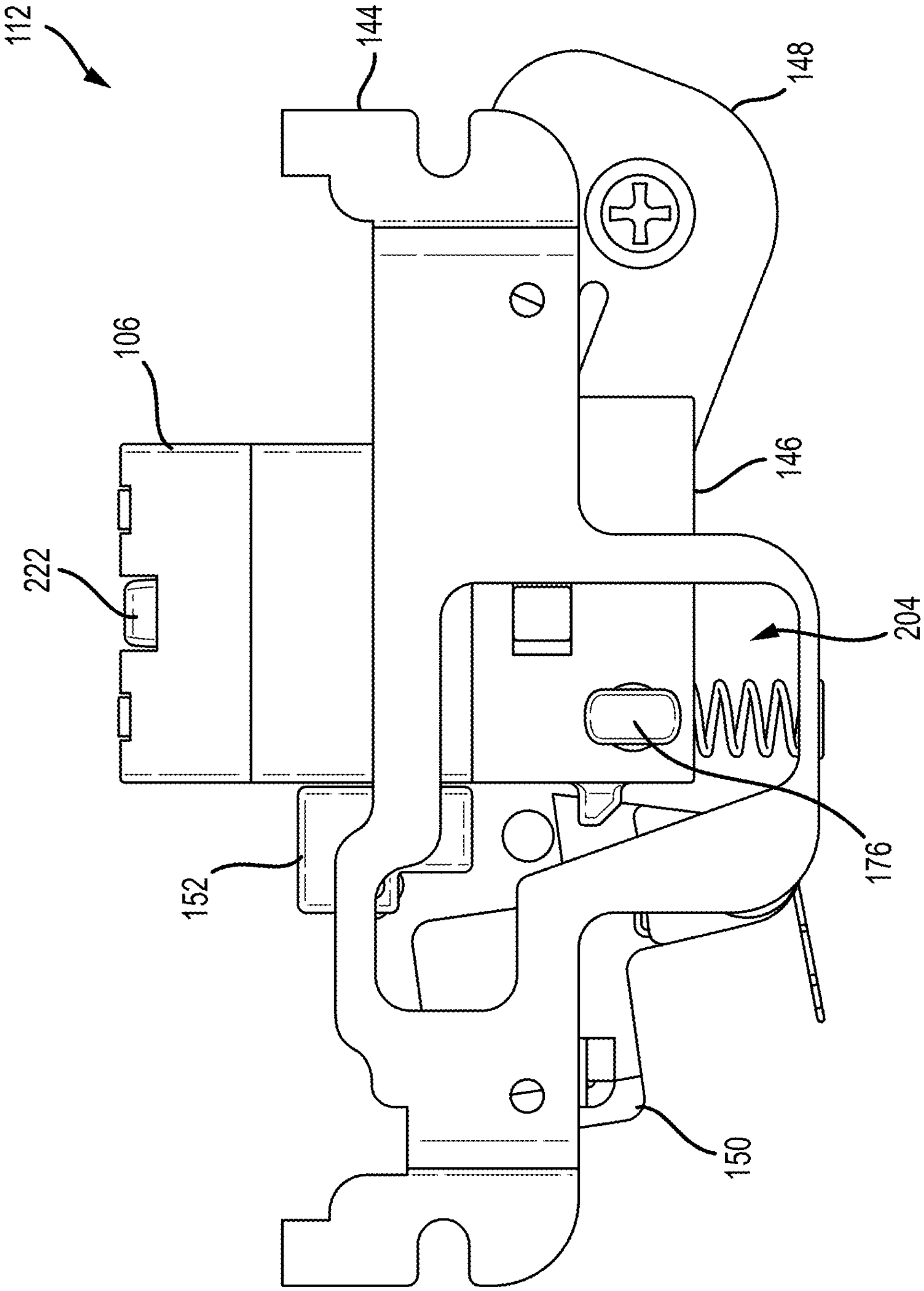
FIGS. 12 and 13 are side views of the latch drive assembly in a loaded configuration.
Figure 13:
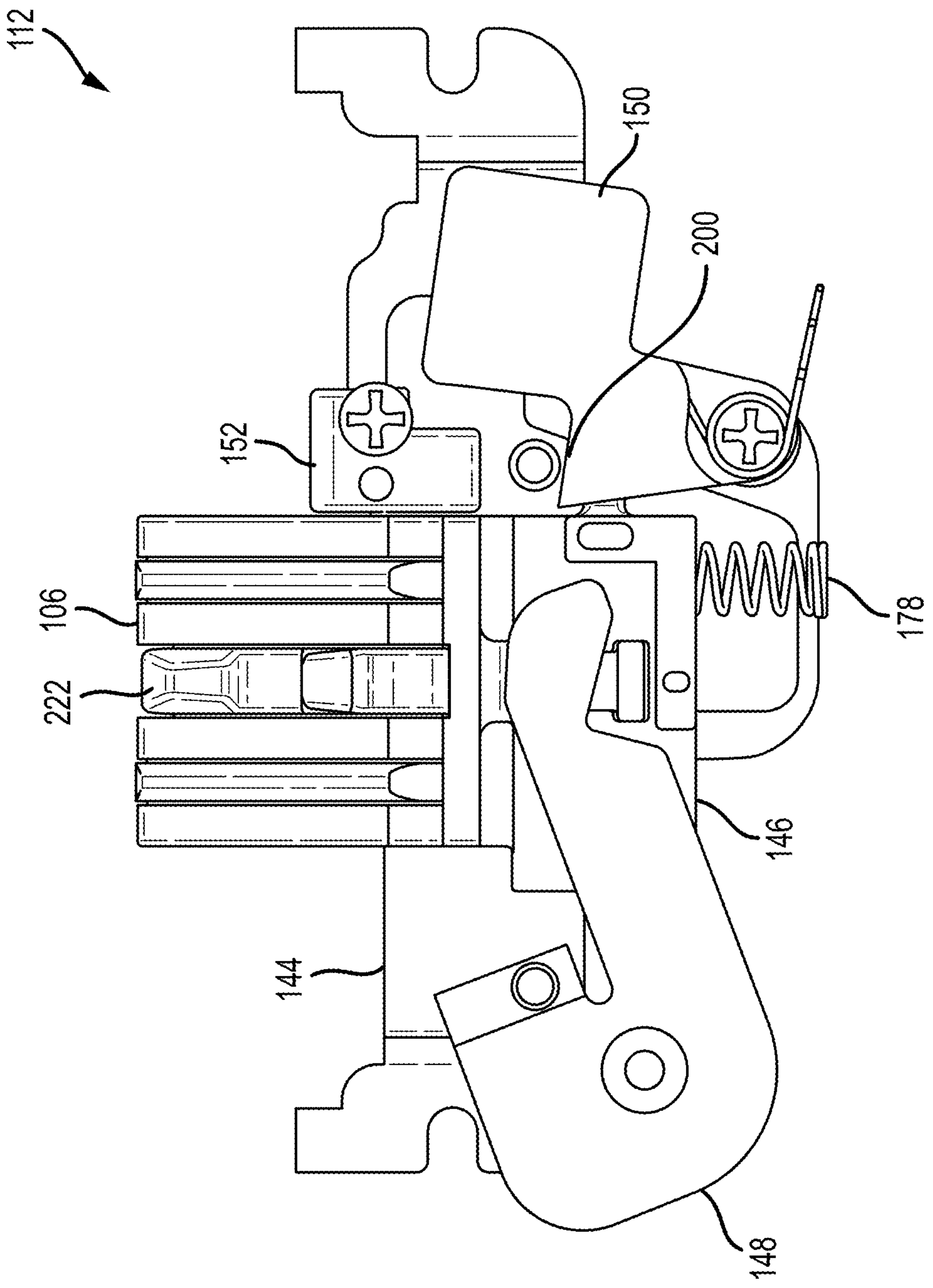

FIGS. 12 and 13 are side views of the latch drive assembly 112 in a loaded configuration. As described above, when the latch drive assembly 112 is moving from the unlocked configuration (shown in FIGS. 8 and 9) towards the locked configuration (shown in FIGS. 5 and 6), the latch drive assembly 112 allows the latch assembly 106 to remain in the loaded configuration with the tip of the latch assembly 106 partially extended out of the housing 102 and face plate 104 (shown in FIGS. 1-3), with the pivot arm 222 engaged with the housing 102 and/or face plate 104 to hold this position. When the pivot arm 222 is released via contacting the corresponding keeper and at least partially being depressed, the latch assembly 106 can automatically fire (e.g., extend) into the keeper without operation of the handle of the central lock assembly 103. The opening 204 of the slide plate 144 facilities this movement of the sliding latch support 146 into the loaded configuration with the latch extension/retraction region 210 and its length 214 (both shown in FIG. 7) along the transverse axis 120. When the latch assembly 106 is in the loaded configuration, the rotating stop plate 150 is rotated out of the travel path of the sliding latch support 146. Additionally, the rotating latch arm 148 is not pushing down on the sliding latch support 146.

Figure 14:
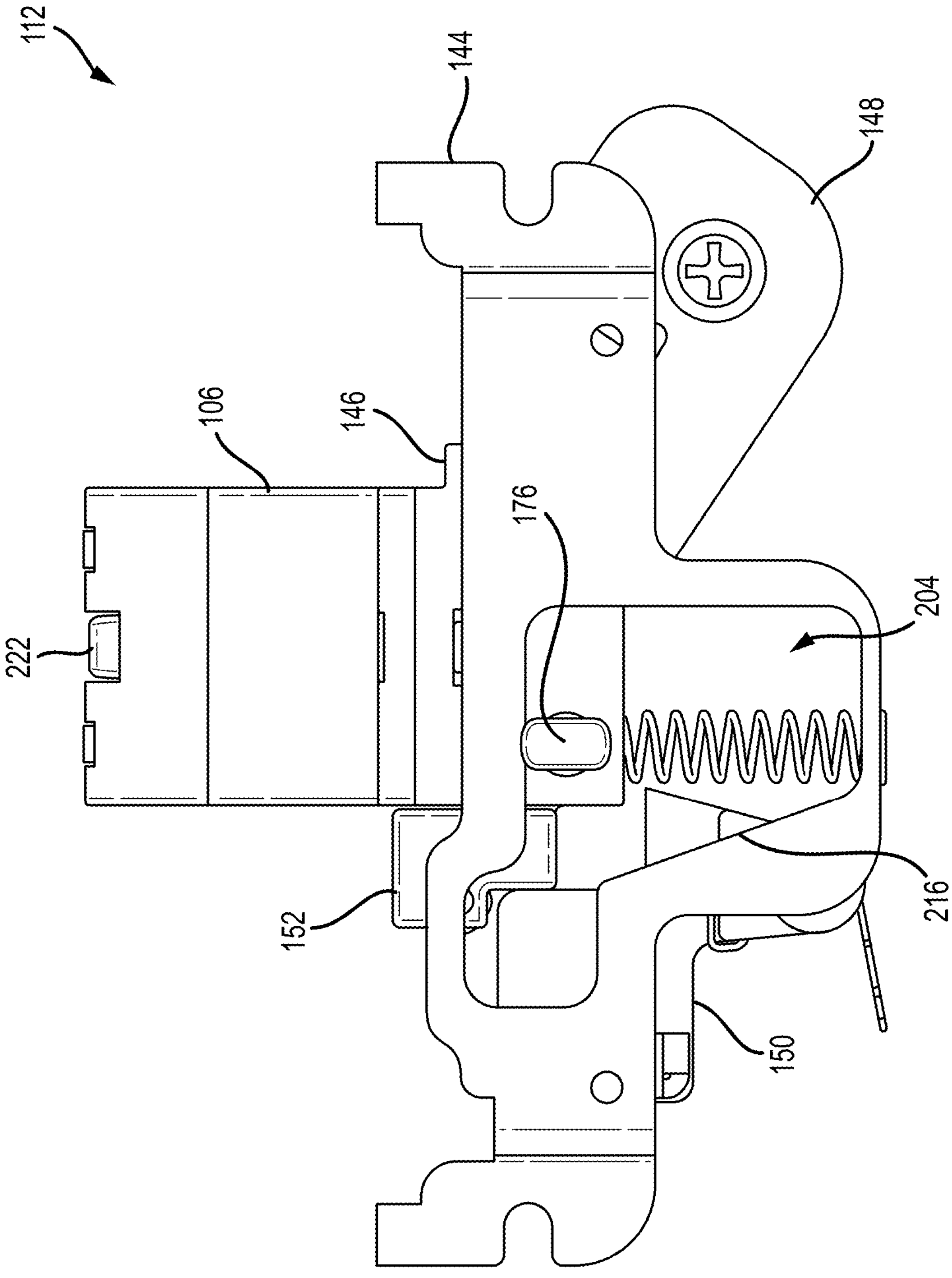
FIGS. 14 and 15 are side views of the latch drive assembly in a fired configuration.
Figure 15:
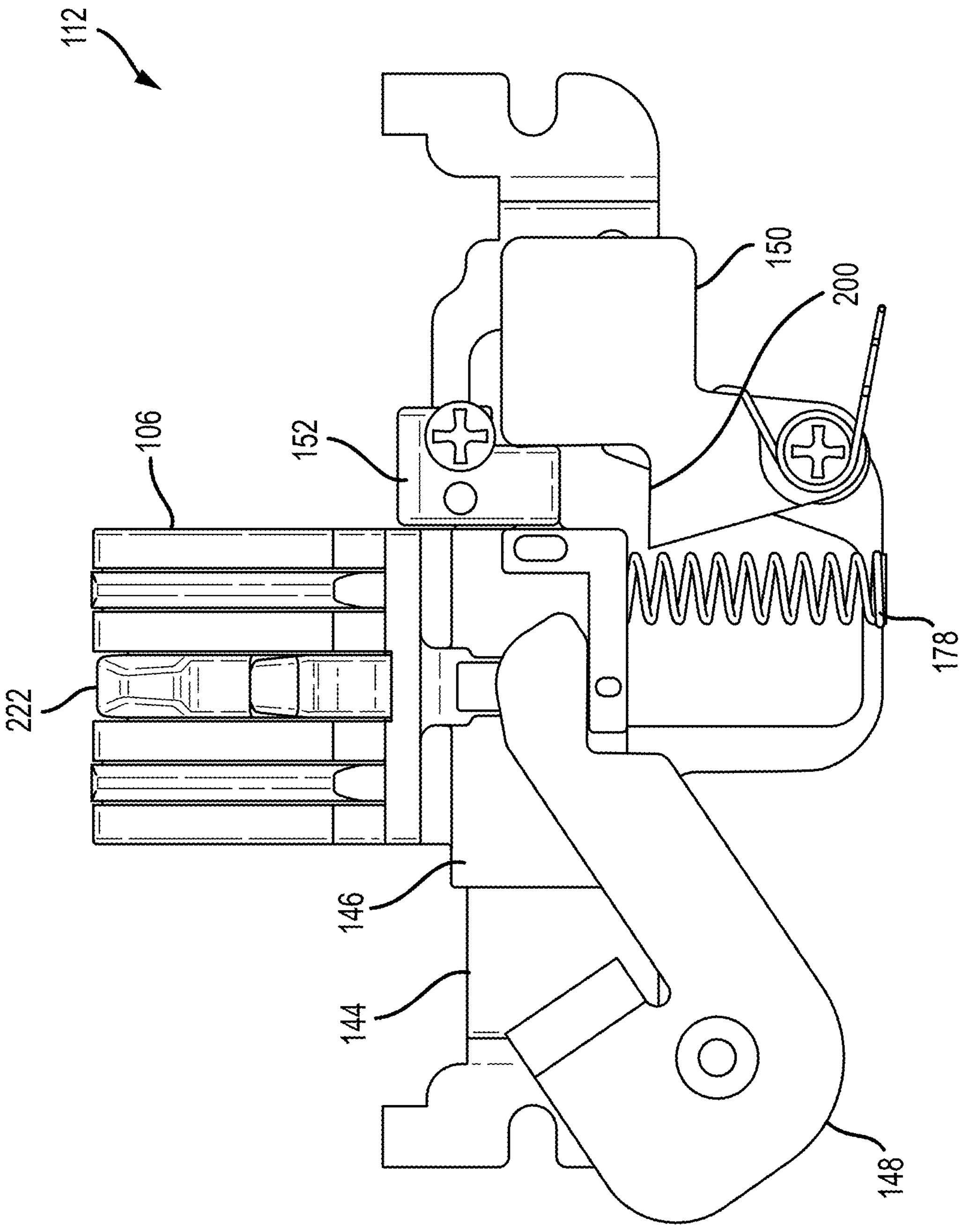

FIGS. 14 and 15 are side views of the latch drive assembly 112 in a fired configuration. Once the latch assembly 106 auto-fires towards the extended position, the latch assembly 106 is blocked from retraction via the rotating stop plate 150 and the stop shoulder 200. The slide plate 144, however, is independently moveable relative to the sliding latch support 146 and the projection 176 is in the intermediate region of the opening 204. This position allows the handle of the central lock assembly 103 (shown in FIG. 1) to be used and actuate the second drive bar 110 and the shoot bolt without moving the latch assembly 106 from the extended position.

In some examples, the auto-fire operation of the latch assembly 106 may not fully extend the latch assembly 106 (e.g., due to a portion of the latch assembly 106 catching on a portion of the keeper). As such, the projection 176 is stuck within the extension/retraction region of the opening 204. When the user is manually sliding the slide plate 144 to the locked configuration (shown in FIGS. 5 and 6) and extending the corresponding shoot bolts, the ramp edge 216 of the opening 204 will engage with the projection 176 and force the latch assembly 106 towards a fully extended position via the angled orientation of the ramp edge 216.

Additionally, when the central lock assembly 103 of the multipoint lock system 101 (shown in FIG. 1) includes an anti-slam operation and an activation pin, the remote lock assembly 100 described herein will not operate unless the anti-slam pin is depressed which will prevent accidental operation. The anti-slam pin on the central lock assembly 103 can also be deactivated if the feature is not desired.

Figure 16:
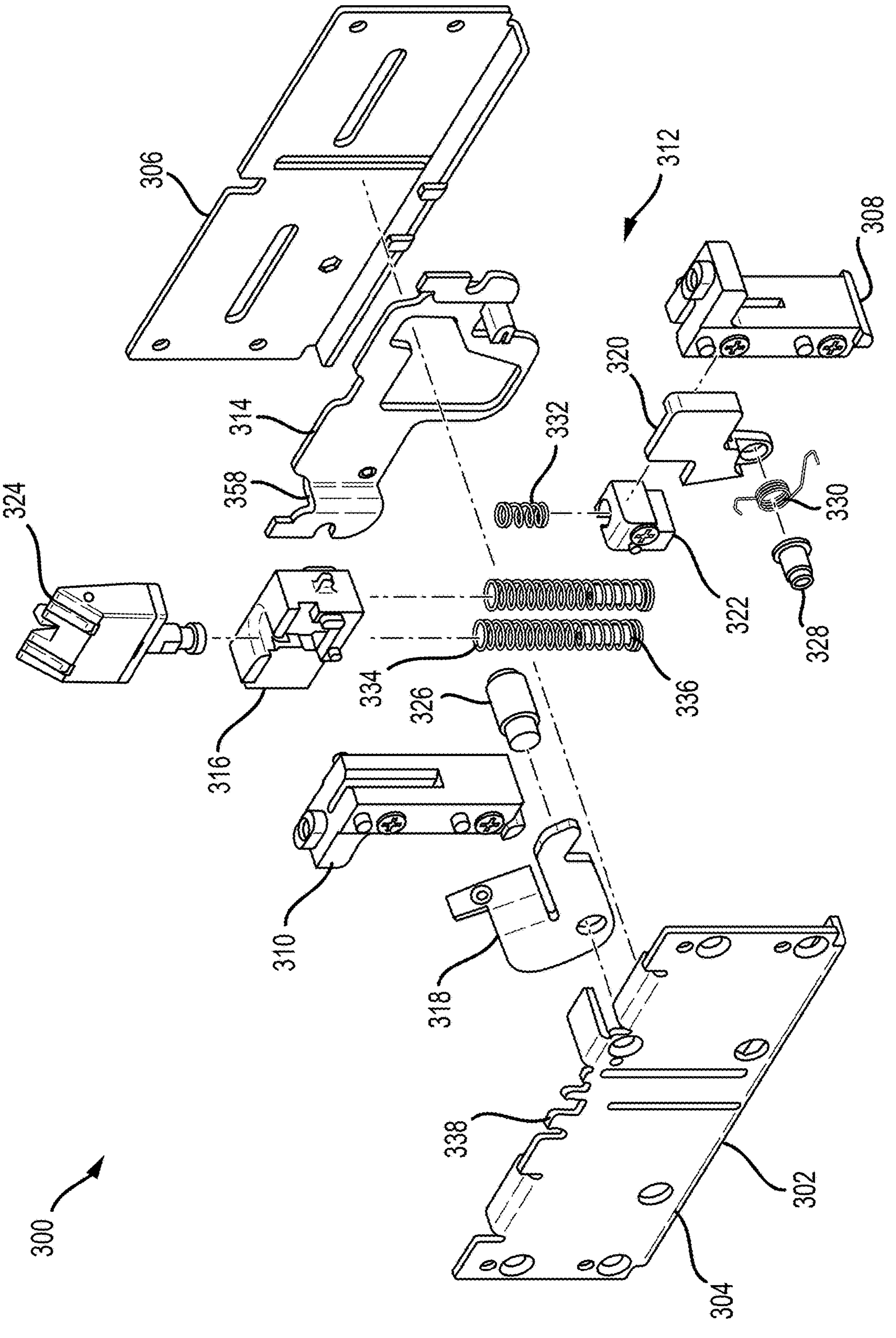
FIG. 16 is an exploded perspective view of another exemplary remote lock assembly.

FIG. 16 is an exploded perspective view of another exemplary remote lock assembly 300 for use with the multipoint lock system 101 (shown in FIG. 1). The remote lock assembly 300 operates the same as the remote lock assembly 100 described above, and with additional features that enable the operational components of the remote lock assembly 300 to move more freely within the system and reduce or eliminate component binding when in use. The remote lock assembly 300 includes a housing 302 with side plates 304, 306 and end caps 308, 310. A latch drive assembly 312 is disposed within the housing 302 and includes a slide plate 314, a sliding latch support 316, a rotating latch arm 318, a rotating stop plate 320, and a fixed latch support 322. A latch assembly 324 is coupled to the sliding latch support 316. The rotating latch arm 318 is mounted at a pivot pin 326. The rotating stop plate 320 is mounted at a pivot pin 328 and biased with biasing member 330. The fixed latch support 322 houses a biasing member 332.

In this example, the sliding latch support 316 is biased with a pair of biasing members 334 (e.g., compression springs) spaced along the longitudinal axis. The biasing members 334 are mounted on spring guides 336 that extend from a rear face of the housing 302. Using two biasing members 334, the auto-fire extension force can be increased and the sliding latch support 316 is more uniformly supported so as to reduce rotation within the housing 302. Additionally, the front end of the housing 302 at the side plate 304, a pair of housing returns 338 project inwards towards the side plate 306. The returns 338 support the latch assembly 324 during the extension and retraction movement of the latch assembly 324.

Figure 17:
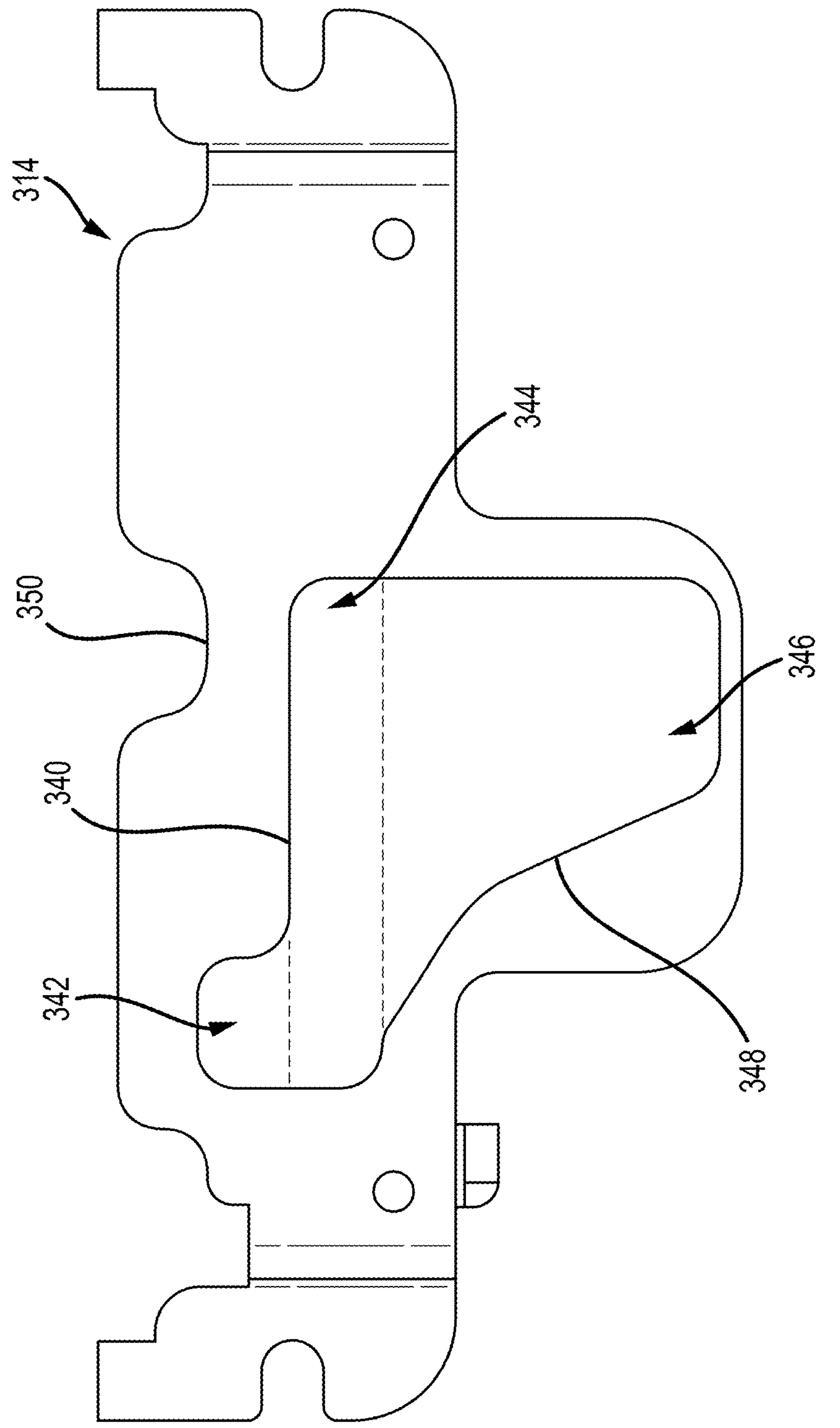
FIG. 17 is a side view of a slide plate of the remote lock assembly shown in FIG. 16.

FIG. 17 is a side view of a slide plate 314 of the remote lock assembly 300 (shown in FIG. 16). The slide plate 314 defines an opening 340 that the projection of the sliding latch support 316 travels within during operation of the latch assembly 324 (both shown in FIG. 16). The opening 340 includes three regions, a latch reversing region 342, an intermediate region 344, and an extension/retraction region 346. In this example, the longitudinal length of the extension/retraction region 346 is increased and a ramp edge 348 of the opening 340 has a curved and rounded shape with steeper angles proximate the bottom and shallower angles proximate the intermediate region 344. By providing a shallower angle proximate the intermediate region 344, the driving force to contact the sliding latch support 316 and move the latch assembly 324 towards a fully extended position is reduced and latch performance increased. The slide plate 314 also includes a top notch 350 that provides space for the pivoting arm of the latch assembly 324 to pivot without contacting the slide plate 314.

Figure 18:
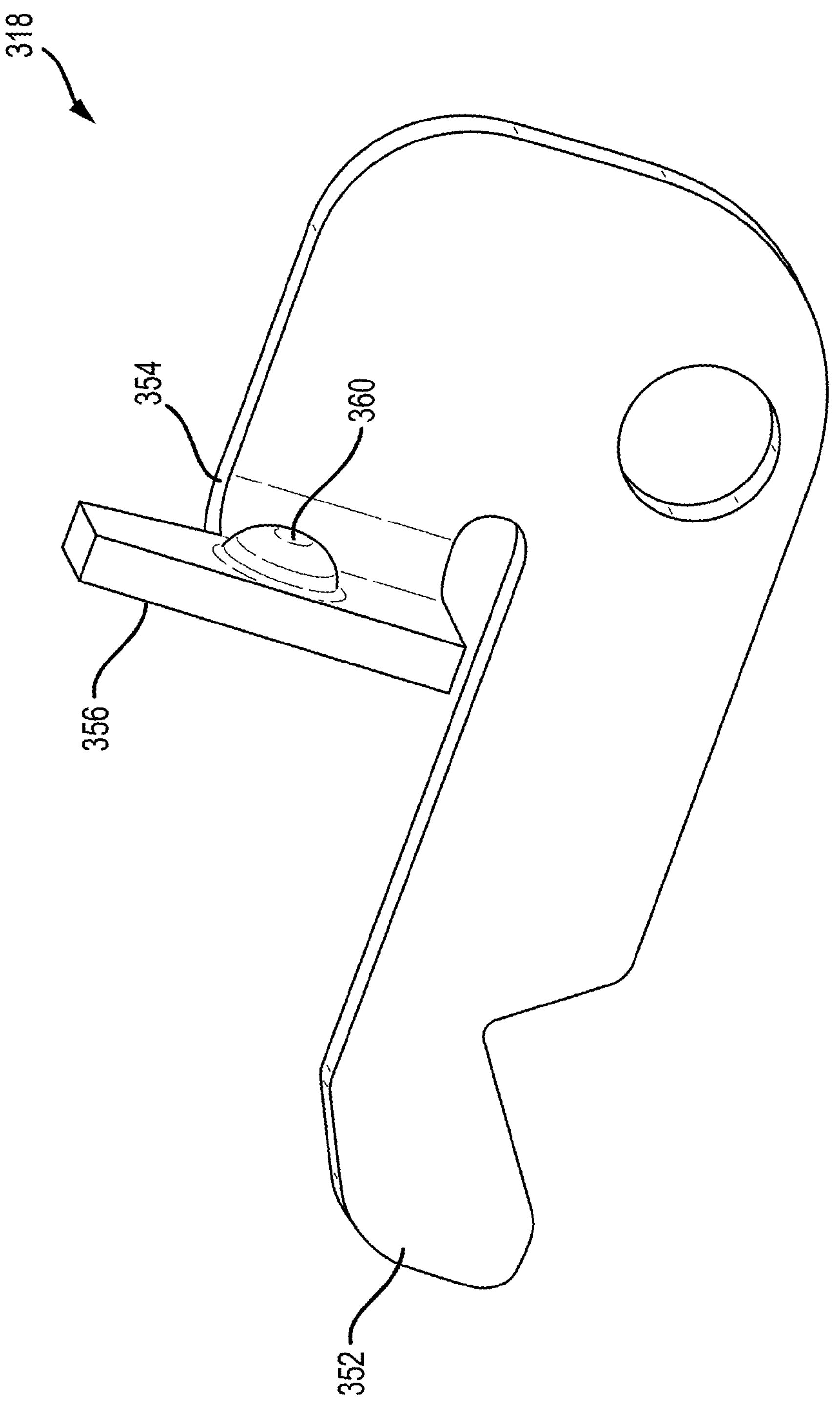
FIG. 18 is a perspective view of a rotating latch arm of the remote lock assembly shown in FIG. 16.

FIG. 18 is a perspective view of the rotating latch arm 318 of the remote lock assembly 300 (shown in FIG. 16). The rotating latch arm 318 includes a nose end 352 and an opposite tail end 354. The nose end 352 has a notch that is configured to form a planar edge that selectively engages with the sliding latch support 316 (shown in FIG. 16). The tail end 354 includes a flange 356 that extends in the transverse direction and is configured to engage with a transverse wall 358 of the slide pate 314 (both shown in FIG. 16). The flange 356 includes a dimple 360 that projects from the flange 356. When the latch drive assembly 312 (shown in FIG. 16) is moving towards the unlocked configuration and retracting the latch assembly 324 (shown in FIG. 16), the dimple 360 facilitates full retraction of the latch assembly 324 without increasing the travel of the slide plate 314.

Figure 19:
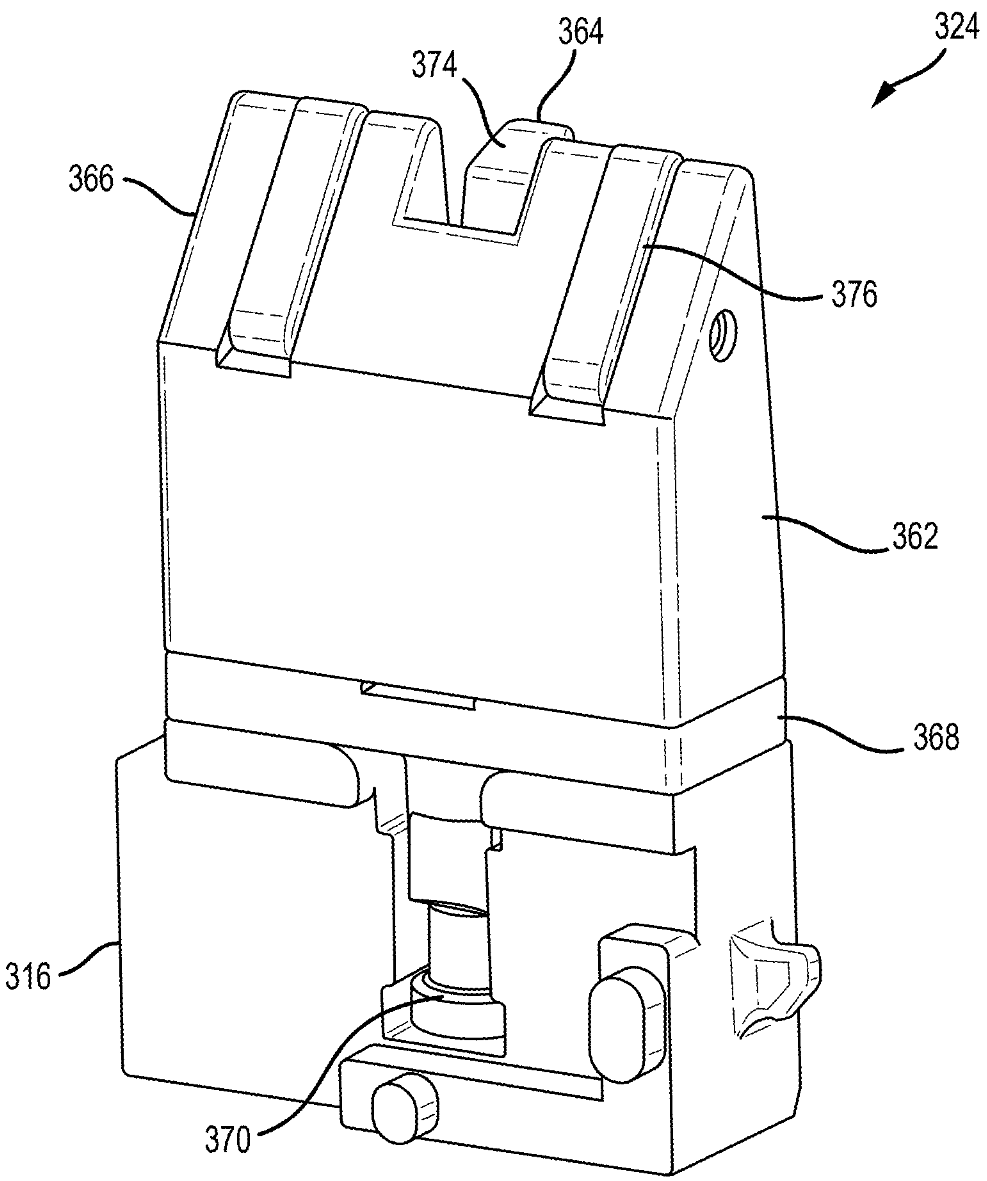
FIGS. 19 and 20 are perspective views of the latch assembly of the remote lock assembly shown in FIG. 16.
Figure 20:
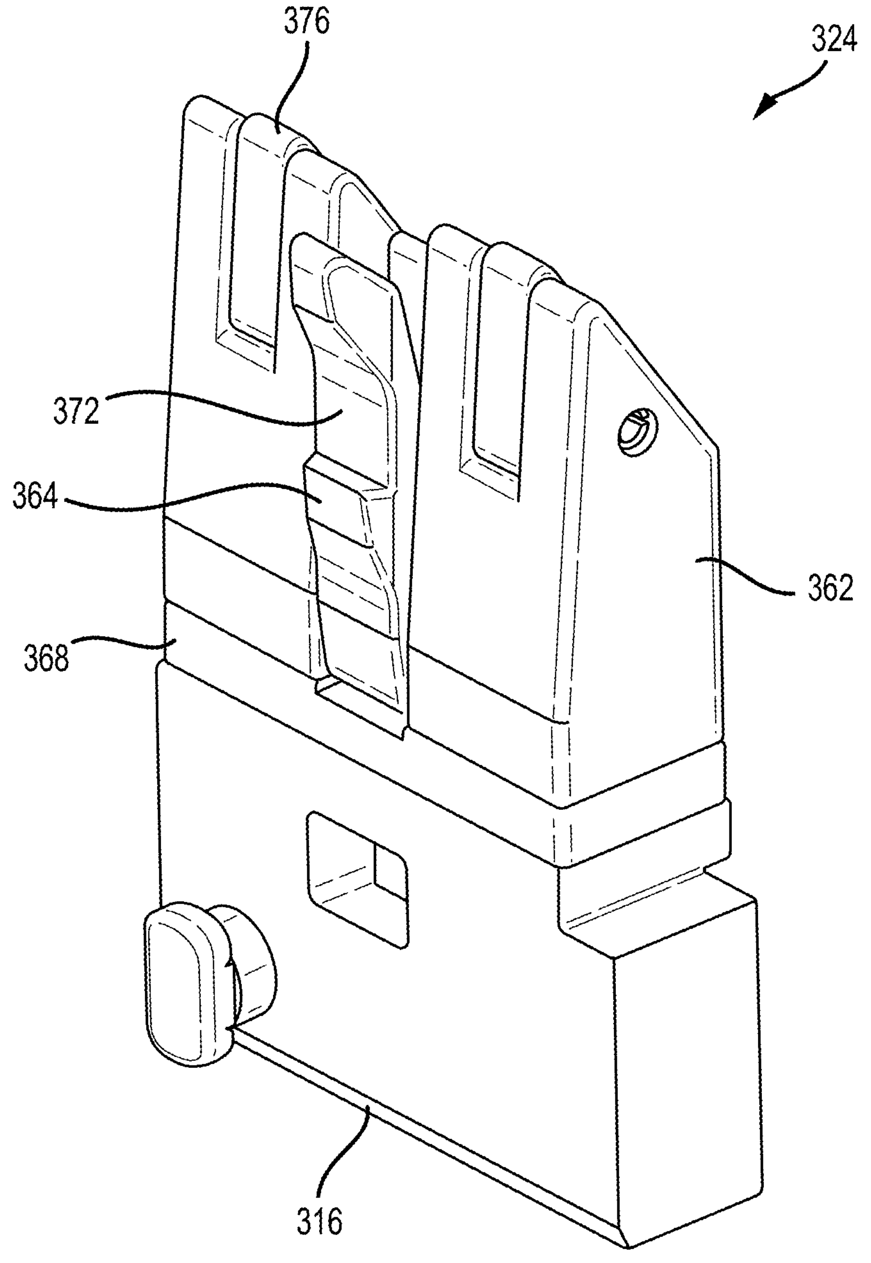

FIGS. 19 and 20 are perspective views of the latch assembly 324 of the remote lock assembly 300 (shown in FIG. 16). The latch assembly 324 includes a main latch body 362 and a pivot arm 364 that is spring biased. The main latch body 362 includes an oblique surface 366 and the pivot arm 364 extends outward opposite the oblique surface 366. The main latch body 362 and the pivot arm 364 are attached to a base 368 and a post 370. The post 370 couples to the sliding latch support 316. As illustrated, the latch assembly 324 is disposed in an opposite 180-degree position relative to the sliding latch support 316 than that illustrated in FIGS. 10 and 11 and described above.

The pivot arm 364 includes a catch 372 for engaging the latch assembly 324 in the loaded configuration. The pivot arm 364 also includes a distal nose 374 that includes a taper that matches the angle of the oblique surface 366 of the main latch body 362. This taper of the pivot arm 364 reduces the latch assembly 324 from catching on the keeper when sliding thereagainst. The main latch body 362 also includes wear strips 376 on both sides of the pivot arm 364. The wear strips 376 partially project from the oblique surface 366 and are disposed partially on an opposite planar surface of the main latch body 362. The wear strips 376 on the planar surface are partially recessed so that the wear strips 376 slide against the housing and/or face plate without increasing friction. In the example, the wear strips 376 have a triangular body that is inserted within corresponding slots on the main latch body 362 and held in place via positioning pins.

Figure 21:
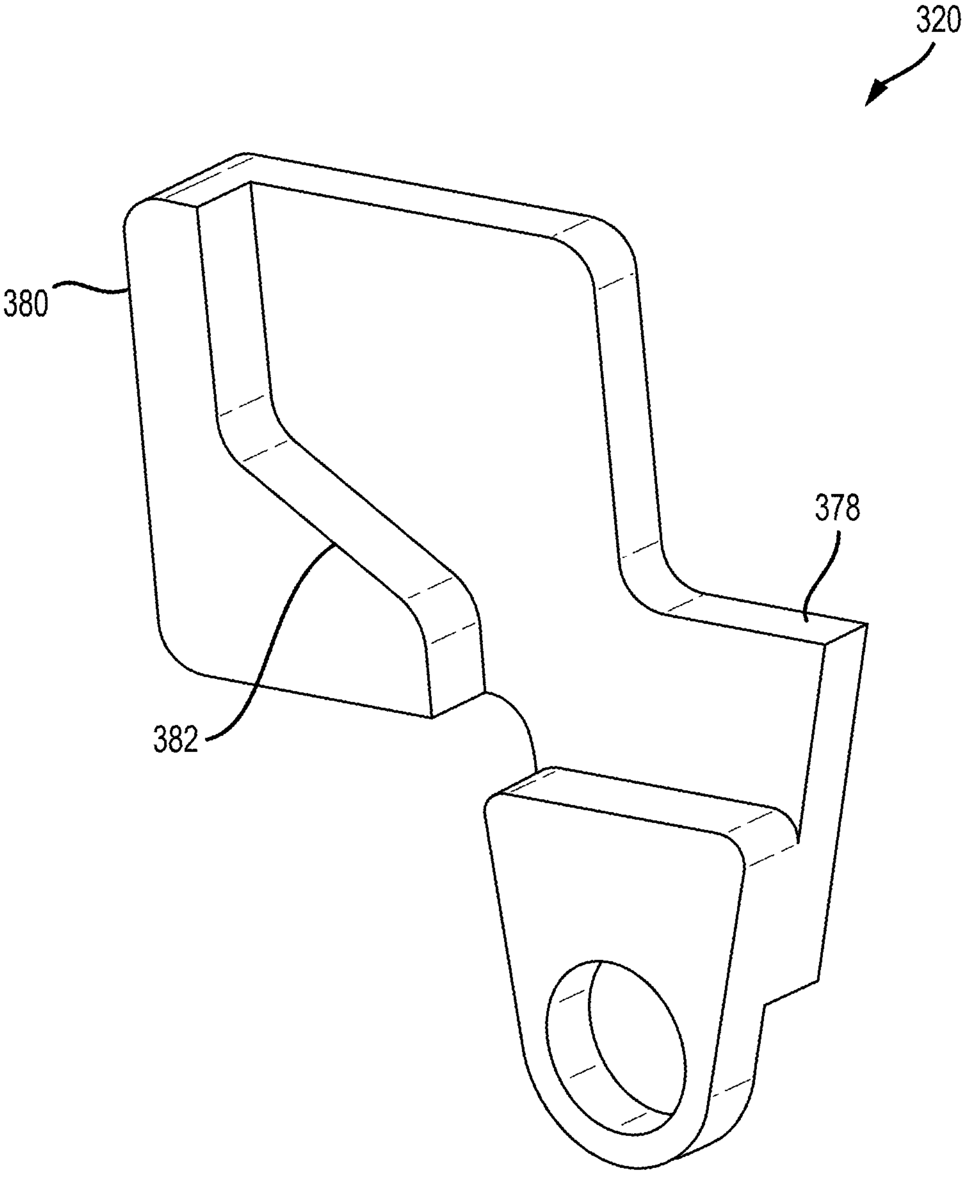
FIG. 21 is a perspective view of a rotating stop plate of the remote lock assembly shown in FIG. 16.

FIG. 21 is a perspective view of the rotating stop plate 320 of the remote lock assembly 300 (shown in FIG. 16). The rotating stop plate 320 includes a stop shoulder 378 on one end and a slide engagement portion 380 on the opposite end. The slide engagement portion 380 includes an angled surface 382 configured to engage with the slide plate 314 (shown in FIG. 16) and for rotating the rotating stop plate 320 as described above.

The multipoint lock system described above facilitates a remote lock assembly that is auto fired into an extended position without the use of the central lock assembly. The central lock assembly, however, still drives unlocking of the latch assembly and is configured to fully extend the throw of the auto-fire extension as required or desired. The remote lock assembly is also configured to drive a secondary remote lock, such as a shoot bolt, as required or desired.

The remote lock assembly includes a latch drive assembly with a slide plate that is operationally driven by a drive bar of the multipoint lock system and via the central lock assembly. The slide plate may also be coupled to a second drive bar so as to drive operation of a shoot bolt located at the top and/or bottom of the door. The movement of the slide plate extends and retracts the latch assembly from the remote lock assembly. The latch assembly is also structured for auto-firing into the extended position during door operation (e.g., contact with a corresponding keeper). The latch assembly is also configured to be manually rotated 180 degrees to change door handing positions as required or desired and without the use of tools.

The materials utilized in the manufacture of the multipoint sliding door lock described herein may be those typically utilized for door hardware, e.g., zinc, steel, aluminum, brass, stainless steel, etc. Molded plastics, such as PVC, polyethylene, etc., may be utilized for the various components. Material selection for most of the components may be based on the proposed use of the sliding door. Appropriate materials may be selected for components used on particularly heavy panels, as well as on components subject to certain environmental conditions (e.g., moisture, corrosive atmospheres, etc.).

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A remote lock assembly for a multipoint lock system of a door comprising:
- a housing having a first end and an opposite second end defining a longitudinal axis, and a first side plate and a second side plate extending between the first end and the second end, the housing defining an interior cavity;
- a latch assembly disposed at a front face of the housing and configured to move between at least an extended position and a retracted position relative to the front face of the housing along a transverse axis orthogonal to the longitudinal axis; and
- a drive assembly disposed within the interior cavity of the housing and configured to operate the latch assembly, the drive assembly comprising:
  - a slide plate selectively slidable along the longitudinal axis, the slide plate having a first end and an opposite second end, the slide plate defining an opening disposed between the first end and the second end of the slide plate;
  - a sliding latch support coupled to the latch assembly and selectively slidable along the transverse axis, the sliding latch support having at least one protrusion extending through the opening of the slide plate and engaged with the housing; and
  - a rotating latch arm pivotably coupled to the housing and having a nose end configured to engage with the sliding latch support and a tail end configured to engage with the second end of the slide plate, wherein the slide plate contacting the tail end of the rotating latch arm causes the nose end to slide the sliding latch support towards a rear end of the housing and move the latch assembly towards the retracted position.

2. The remote lock assembly of claim 1, wherein the drive assembly further comprises a rotating stop plate pivotably coupled to the housing and having a stop shoulder configured to engage with the sliding latch support and a slide engagement portion configured to engage with the first end of the slide plate, wherein the slide plate contacting the slide engagement portion of the rotating stop plate causes the stop shoulder to be removed from a travel path of the sliding latch support.

3. The remote lock assembly of claim 1, wherein the drive assembly further comprises a fixed latch support, the fixed latch support housing a biasing member configured to engage with the sliding latch support when the latch assembly is in the extended position.

4. The remote lock assembly of claim 1, wherein the drive assembly further comprises at least one biasing member disposed between a rear face of the housing and the sliding latch support, the at least one biasing member biasing the latch assembly towards the extended position.

5. The remote lock assembly of claim 1, wherein the opening defines a first region having a longitudinal length configured to enable the slide plate to move relative to the sliding latch support without moving the latch assembly and a second region having a transverse length configured to enable the sliding latch support to move relative to the slide plate.

6. The remote lock assembly of claim 5, wherein a ramp edge at least partially defines the opening proximate the first end of the slide plate, the ramp edge at least partially rounded.

7. The remote lock assembly of claim 5, wherein the opening further defines a third region configured to receive the sliding latch support while the latch assembly is being manually pulled from the front face of the housing for changing a handing position of the latch assembly.

8. A remote lock assembly for a multipoint lock system of a door comprising:
- a housing having a first end and an opposite second end defining a longitudinal axis;
- a latch assembly disposed at a front face of the housing and configured move between at least an extended position and a retracted position relative to the front face of the housing along a transverse axis orthogonal to the longitudinal axis, the latch assembly biased toward the extended position; and
- a drive assembly disposed within the housing and configured to operate the latch assembly, the drive assembly comprising:
  - a slide plate moveable along the longitudinal axis between at least a locked configuration and an unlocked configuration, the slide plate defining an opening;
  - a sliding latch support coupled to the latch assembly and slidably supported by the housing along the transverse axis, the sliding latch support having at least one protrusion extending at least partially within the opening of the slide plate; and
  - a rotating latch arm pivotably coupled to the housing, wherein:
  - (a) when the slide plate is in the unlocked configuration, the sliding latch support is slidable along the transverse axis so that the latch assembly is moveable between the extended position and the retracted position;

(b) when the slide plate moves from the unlocked configuration to the locked configuration, the opening is shaped and sized to enable the sliding latch support to position the latch assembly in the extended position; and (c) when the slide plate moves from the locked configuration to the unlocked configuration, the slide plate contacts the rotating latch arm to engage the sliding latch support and move the latch assembly towards the retracted position.

9. The remote lock assembly of claim 8, wherein the drive assembly further comprises a rotating stop plate pivotably coupled to the housing, wherein when the latch assembly is in the extended position, the rotating stop plate engages with the sliding latch support to prevent movement of the latch assembly towards the retracted position, and when the slide plate moves from the locked configuration to the unlocked configuration, the slide plate pivots the rotating stop plate out of engagement with the sliding latch support.

10. The remote lock assembly of claim 8, wherein when the latch assembly is in the extended position and the slide plate is in the locked configuration, the latch assembly is configured to be manually pulled from the front face of the housing and rotated relative to the sliding latch support so as to change a handing configuration of the latch assembly.

11. The remote lock assembly of claim 8, wherein the latch assembly includes a main body and a pivot arm, wherein when the latch assembly is moved from the extended position to the retracted position via movement of the slide plate from the locked configuration to the unlocked configuration, the pivot arm is configured to engage with the housing so as to hold the latch assembly in a loaded configuration within the housing and only partially extending from the housing.

12. The remote lock assembly of claim 11, wherein when an external force contacts the pivot arm of the latch assembly while in the loaded configuration, the latch assembly is configured to automatically fire into the extended position without movement of the slide plate.

13. The remote lock assembly of claim 8, wherein the slide plate includes a first end and an opposite second end along the longitudinal axis, the first end and the second end of the slide plate both having a tab disposed proximate the front face of the housing, each tab configured to couple to a drive bar of the multipoint lock system.

14. The remote lock assembly of claim 8, wherein the rotating latch arm includes a tail end having a dimple configured to at least partially engage the slide plate when the slide plate is moving towards the unlocked configuration.

15. A multipoint lock system for a door comprising:

a gearbox configured to slide at least one drive bar along a longitudinal axis;

a face plate for an edge of the door and covering the at least one drive bar; and at least one remote lock assembly coupled to the at least one drive bar and comprising:

a housing mounted to the face plate and defining an interior cavity;

a latch assembly supported by the housing and configured move between at least an extended position and a retracted position relative to the face plate along a transverse axis orthogonal to the longitudinal axis; and a drive assembly disposed within the interior cavity of the housing and configured to operate the latch assembly, the drive assembly comprising:

a slide plate selectively slidable along the longitudinal axis via the at least one drive bar, the slide plate having a first end coupled to the at least one drive bar and an opposite second end, the slide plate defining an opening disposed between the first end and the second end of the slide plate;

a sliding latch support coupled to the latch assembly and selectively slidable along the transverse axis, the sliding latch support having at least one protrusion extending through the opening of the slide plate and engaged with the housing; and a rotating latch arm pivotably coupled to the housing and having a nose end configured to engage with the sliding latch support and a tail end configured to engage with the second end of the slide plate, wherein the slide plate contacting the tail end of the rotating latch arm causes the nose end to slide the sliding latch support towards a rear end of the housing and move the latch assembly towards the retracted position.

16. The multipoint lock system of claim 15, wherein the at least one drive bar is a first drive bar and the multipoint lock system includes a second drive bar slidable along the longitudinal axis and coupled to the second end of the slide plate of the at least one remote lock assembly, the second drive bar operationally coupled to a shoot bolt.

17. The multipoint lock system of claim 15, wherein the latch assembly includes a main body and a pivot arm, the main body having an oblique surface defining a handing configuration of the latch assembly and the pivot arm having a distal end with a taper that corresponds to the oblique surface of the main body.

18. The multipoint lock system of claim 15, wherein the slide plate is moveable along the longitudinal axis between at least a locked configuration and an unlocked configuration, and wherein the opening of the slide plate is configured to:

(a) when the latch assembly is in the extended position, enable the slide plate to independently slide towards the locked configuration from the unlocked configuration;

(b) move the latch assembly towards the retracted position when the slide plate slides from the locked configuration towards the unlocked configuration; and (c) when the latch assembly is in an intermediate loaded configuration, enable the latch assembly to move towards the extended position while the slide plate is in the unlocked configuration.

19. The multipoint lock system of claim 18, wherein the opening of the side plate is further configured to (d) when the latch assembly is in the extended position and the slide plate is in the locked configuration, allow the latch assembly to be pulled at least partially out of the housing and its handing configuration reversed.

20. The multipoint lock system of claim 15, wherein the drive assembly further comprises a rotating stop plate pivotably coupled to the housing, wherein when the latch assembly is in the extended position, the rotating stop plate engages with the sliding latch support to prevent movement of the latch assembly towards the retracted position.

* * * * *